(12) United States Patent
Eguchi et al.

(10) Patent No.: US 8,812,779 B2
(45) Date of Patent: Aug. 19, 2014

(54) STORAGE SYSTEM COMPRISING RAID GROUP

(75) Inventors: Yoshiaki Eguchi, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1142 days.

(21) Appl. No.: 12/310,727

(22) PCT Filed: Feb. 26, 2009

(86) PCT No.: PCT/JP2009/000841
§ 371 (c)(1),
(2), (4) Date: Mar. 5, 2009

(87) PCT Pub. No.: WO2010/097832
PCT Pub. Date: Sep. 2, 2010

(65) Prior Publication Data
US 2011/0167215 A1    Jul. 7, 2011

(51) Int. Cl.
*G06F 12/00* (2006.01)
(52) U.S. Cl.
USPC .......................................................... 711/114
(58) Field of Classification Search
None
See application file for complete search history.

(56) References Cited

U.S. PATENT DOCUMENTS

| | | | | |
|---|---|---|---|---|
| 5,479,653 | A * | 12/1995 | Jones | 714/5.11 |
| 2003/0088803 | A1 | 5/2003 | Arnott et al. | |
| 2003/0237019 | A1 | 12/2003 | Kleiman et al. | |
| 2006/0248381 | A1 * | 11/2006 | Fujita et al. | 714/6 |
| 2006/0277386 | A1 * | 12/2006 | Eguchi | 711/170 |
| 2006/0277432 | A1 * | 12/2006 | Patel et al. | 714/6 |
| 2007/0174673 | A1 | 7/2007 | Kawaguchi et al. | |
| 2008/0126844 | A1 | 5/2008 | Morita et al. | |
| 2008/0201392 | A1 | 8/2008 | Nakajima et al. | |

FOREIGN PATENT DOCUMENTS

| | | |
|---|---|---|
| EP | 1 873 644 A2 | 11/2006 |
| JP | 2006-338341 | 6/2005 |
| JP | 2007-199922 | 1/2006 |
| JP | 2008-46986 | 8/2006 |

OTHER PUBLICATIONS

Massiglia, The RAID Book, 6th ed., 1997.*
U.S. Appl. No. 12/128,974, filed May 29, 2008, Ninose.
International Search Report mailed Feb. 24, 2010.
Office Action, issued from Japanese Patent Office, in corresponding Japanese Patent Application No. 2011-514951, dated Jul. 10, 2012, pp. 1-3.

* cited by examiner

*Primary Examiner* — Sheng-Jen Tsai
*Assistant Examiner* — Ramon A Mercado
(74) *Attorney, Agent, or Firm* — Nicholas Trenkle, Esq.; Stites & Harbison, PLLC

(57) ABSTRACT

A pool that is a storage area group composed of a plurality of real pages based on a plurality of RAID groups is managed. The storage system carries out the rebuild processing that includes the steps of copying each of data that has been stored into all allocated real pages among all real pages based on a specific RAID group to an unallocated real page based on at least one RAID group separate from the specific RAID group, allocating a real page of each copy destination to each virtual page of an allocated destination of an allocated real page of each copy source, and canceling an allocation of an allocated real page of each copy source to a virtual page.

11 Claims, 22 Drawing Sheets

FIG.14
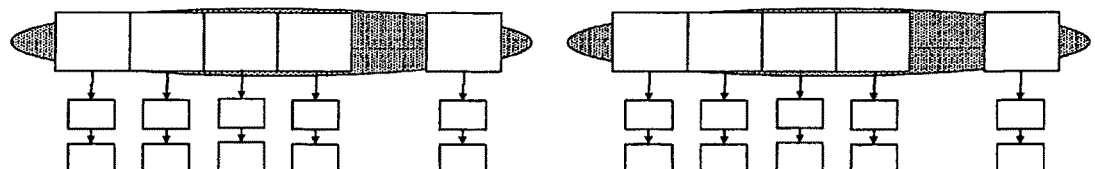
1401F     1401F     1401R     1401R
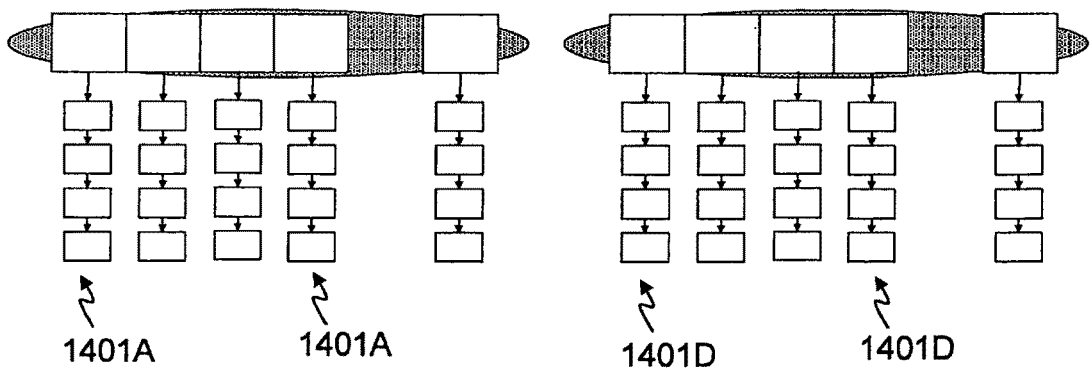
1401A     1401A     1401D     1401D
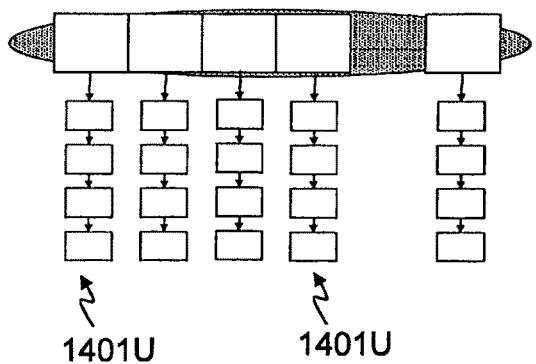
1401U     1401U

US 8,812,779 B2

STORAGE SYSTEM COMPRISING RAID GROUP

TECHNICAL FIELD

The present invention generally relates to a storage control of a storage system comprising a RAID group.

BACKGROUND ART

In general, a storage system to which the technology called RAID (Redundant Arrays of Independent (or Inexpensive) Disks) is adopted comprises a storage device group composed of a plurality of physical storage devices (hereafter referred to as PDEV). The storage device group of this kind is called a RAID group (or a parity group or an ECC (Error-Correcting Code) group) in general.

The storage area of a RAID group is composed of a plurality of sub storage area lines. Each sub storage area line is disposed over a plurality of PDEVs that configure the RAID group, and is composed of a plurality of sub storage areas corresponding to a plurality of PDEVs. Hereafter a sub storage area is referred to as "stripe", and a line composed of a plurality of stripes is referred to as "stripe line".

It is known that the RAID has some levels (hereafter referred to as a RAID level).

For instance, RAID5 will be described below. For RAID5, data is dispersed and written to a plurality of PDEVs (such as hard disk drives (HDDs)) that configure the RAID group corresponding to RAID5. More specifically, for instance, the write target data is divided into data having a prescribed size (hereafter referred to as a data unit as a matter of practical convenience), each data unit is divided into a plurality of data elements, and the plurality of data elements is written to a plurality of stripes. Moreover, for RAID5, in order to restore data elements that cannot be written from a PDEV due to a defect that has occurred in the PDEV, the redundant information called "parity" (hereafter referred to as a redundancy code) is generated for one data unit, and the redundancy code is written to the stripe. More specifically, as shown in FIG. 1A, in the case in which the number of PDEVs that configure a RAID group 205 is 4, one stripe line 207 is composed of four stripes corresponding to four PDEVs 201-1 to 201-4. Three data elements A to C that configure a data unit 203 are written to three stripes corresponding to three PDEVs 201-1 to 201-3. A redundancy code D is written to a stripe corresponding to remaining one PDEV.

As shown in FIG. 1B, in the case in which a defect occurs in a PDEV 201-3, the data element C cannot be read. Consequently, a rebuild have to be carried out. As a general method of the rebuild, a collection copy is adopted (for instance, see Patent Citation 1). For the collection copy, the data element C that cannot be read is restored on a cache memory 209 for instance by using the redundancy code D and the other two data elements A and B that configure the data unit 203. The restored data element C is then copied to another PDEV 201S (for instance a spare PDEV).

Patent Citation 1

Japanese Patent Application Laid-Open Publication No. 2008-046986

DISCLOSURE OF INVENTION

Technical Problem

In recent years, the PDEV has been in a large-capacity state. Consequently, for a collection copy, many data elements that have been stored into one PDEV are restored, and all of the many data elements are copied to another PDEV in some cases. Therefore, it may take a long time to complete the collection copy. Even during the collection copy, a read request can be received from an external device of the storage system (such as a host computer). However, a period of time while a collection copy is being carried out is a period when the redundancy is low. Consequently, in the case in which it takes a long time for carrying out the collection copy, a period of a low redundancy becomes longer.

The above problem may occur not only in the case in which RAID5 is adopted as a RAID level of the RAID group but also in the case in which another RAID level is adopted.

An object of the present invention is to provide the rebuild technology that can be completed in a time shorter than that of a collection copy.

Technical Solution

A pool that is a storage area group composed of a plurality of real pages based on a plurality of RAID groups is managed. A storage system comprises an I/O part configured to carry out a write processing and a rebuild control part configured to carry out a rebuild processing. The write processing includes the following steps (W1) and (W2):

(W1) allocating any of unallocated real pages among a plurality of real pages to a write destination virtual page among a plurality of virtual pages that configure a virtual volume; and (W2) writing a write target data to the unallocated real page that is allocated to the write destination virtual page.

The rebuild processing includes the following steps (R1) and (R2):

(R1) copying each of data that has been stored into all allocated real pages among all real pages based on a specific RAID group to an unallocated real page based on at least one RAID group separate from the specific RAID group; and (R2) allocating a real page of each copy destination in place of an allocated real page of each copy source to each virtual page of an allocated destination of an allocated real page of each copy source.

Each real page is a physical storage area, and each virtual page is a virtual storage area.

A real page that is allocated by a write processing is a free page for instance, and a real page that becomes a copy destination by a rebuild processing is a reserve page for instance. The free page is a real page that is not allocated to any of a plurality of virtual pages and that can be allocated to a write destination virtual page. The reserve page is not a free page but a real page that is not allocated to any of virtual pages and that is not allocated to a write destination virtual page in a write processing.

It is also possible that all real pages based on the RAID group do not exist in a pool. For instance, a storage space part among storage spaces based on a RAID group can be corresponded to at least two real pages that exist in a pool, and another storage space part among the storage spaces can be corresponded to a storage area separate from a pool. Moreover, at least one real page in a pool can be a storage area based on a storage resource in a so-called external connection storage system.

BRIEF DESCRIPTION OF DRAWINGS

FIG. 14 shows a kind of a queue that is managed by the storage system 30.

EXPLANATION REFERENCE

30: Storage system

BEST MODE FOR CARRYING OUT THE INVENTION

An embodiment in accordance with the present invention will be described below in detail with reference to the drawings. In the following descriptions, a RAID group is referred to as RG in some cases.

Figure 2:
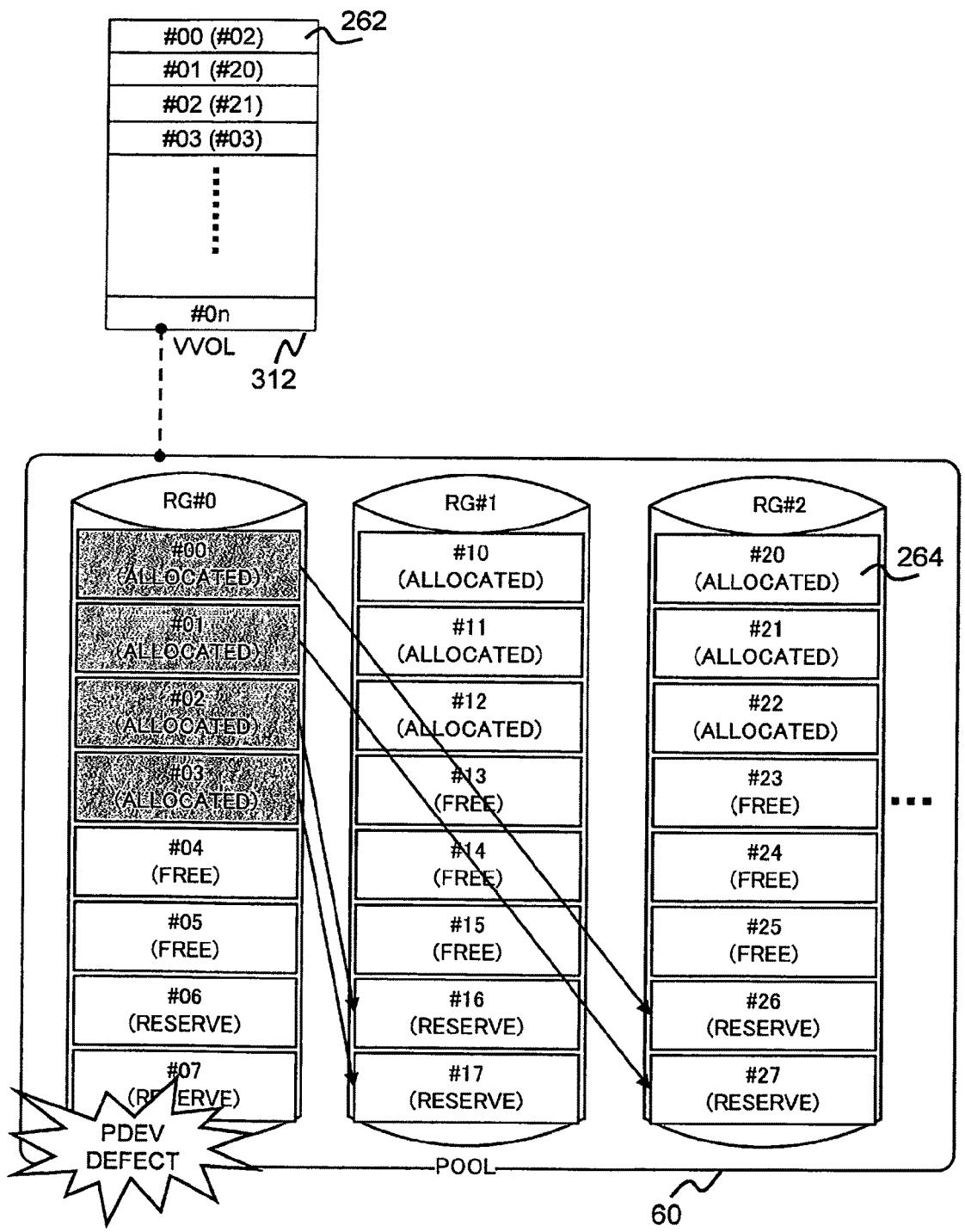
FIG. 2 is an illustration for an outline of an embodiment in accordance with the present invention.

FIG. 2 is an illustration for an outline of an embodiment in accordance with the present invention.

A pool 60 is managed. The pool 60 is a storage area group composed of a plurality of real pages 264 based on a plurality of RAID groups (for instance, RG#0, RG#1, RG#2, and so on). A real page 264 in the pool 60 can be allocated to a virtual page 262 in a virtual volume (hereafter referred to as VVOL) 312. The real page 264 to be allocated is a free page (FREE). A free page is a real page that is not allocated to any of virtual pages 262. In the case in which a free page is allocated to any of virtual pages 262, the free page is changed to an allocated page (ALLOCATED). An allocated page is a real page that is allocated to any of virtual pages 262. The virtual page 262 is a virtual storage area, and the real page 264 a physical storage area.

For the embodiment in accordance with the present invention, the pool 60 includes a reserve page. The reserve page is not a free page but a real page that is not allocated to any of virtual pages and that is not allocated to a write destination virtual page specified in a write request from the host computer.

In the example shown in FIG. 2, a code in a block indicating a real page 264 is an identifier of the real page 264. The parenthesized characters in the block indicate a kind of the real page 264 indicated by the block. A number that is not parenthesized in a block indicating a virtual page 262 is an identification number of the virtual page 262. A number that is parenthesized in the block is an identification number of a real page allocated to the virtual page 262. The virtual page 262 indicated by a block that does not include parentheses is a virtual page to which a default page described later is allocated (in other words, a virtual page to which any real page is not allocated practically).

Each RAID group is composed of a plurality of physical storage devices (PDEV). For the embodiment in accordance with the present invention, in the case in which a defect of PDEV is detected, the rebuild processing that includes the following steps (R1) and (R2) is carried out:

(R1) copying each of data that has been stored into all allocated real pages based on a RAID group (hereafter referred to as RG) provided with a PDEV in which a defect is detected to a reserve page based on an RG separate from the defect RG; and (R2) in place of an allocated page of each copy source, allocating a reserve page of each copy destination to each virtual page to which an allocated page of each copy source is allocated (a reserve page of each copy destination is allocated to each virtual page to which an allocated page of each copy source is allocated, and an allocation of an allocated real page of each copy source to a virtual page is canceled).

The processing of (R1) is as shown in FIG. 2 for instance. More specifically, data is copied from all allocated pages #00, #01, #02, and #03 based on the defect RG #0 to reserve pages #26, #27, #16, and #17 based on other RG (for instance RG#1 and RG#2), respectively. A plurality of reserve pages to be a copy destination can be distributed to a plurality of RGs, and can be concentrated to one RG. However distributing a plurality of reserve pages may be preferable to concentrating them to one RG because I/O performance will become worse if flocking to same PDEV is occurred, Further, data is copied to reserve pages in this embodiment, however, data may be copied to at least one free page in another embodiment.

Figure 3:
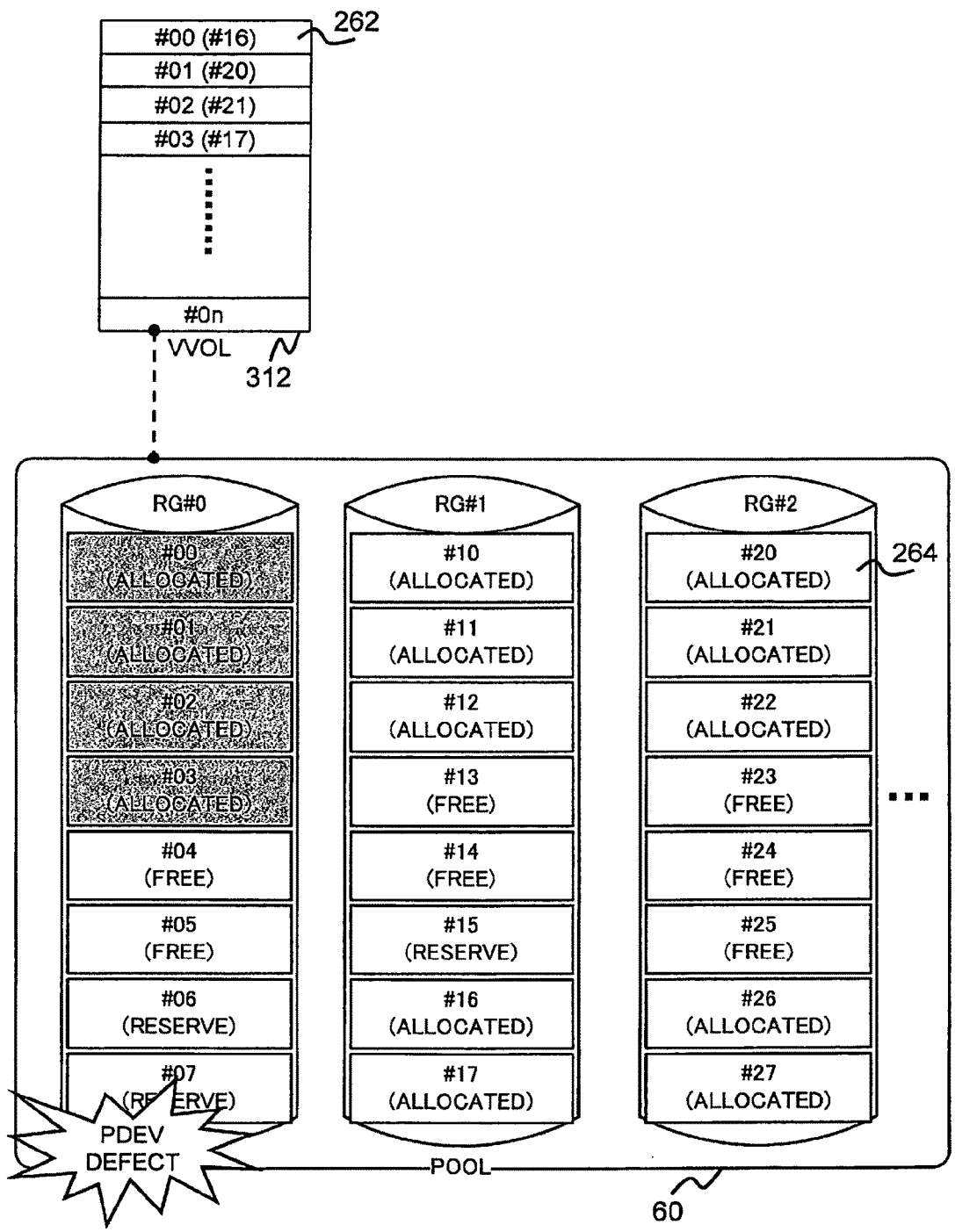
FIG. 3 illustrates that an allocated destination of a virtual page is changed from an allocated page of a copy source to a reserve page of a copy destination.

The processing of (R2) is as shown in FIG. 3 for instance. More specifically, a reserve page of a copy destination (for instance #16) is allocated to a virtual page (for instance #00) allocated to a real page of a copy source (for instance #02), and an allocation of a real page of a copy source (for instance #02) to the virtual page (for instance #00) is canceled. Consequently, a real page of a copy destination (for instance #16) is changed from a reserve page to an allocated page. As shown in FIG. 3, according to a copy of data to a reserve page (for instance #16), a free page (for instance #15) in an RG (for instance #1) provided with the reserve page (for instance #16) can be changed to a reserve page. This can be carried out in the case in which a copy destination of data in an allocated page based on the defect RG is insufficient when any of other RGs involved with a pool 60 is changed to the defect RG. The number of free pages that are changed to reserve pages can be determined based on the number of reserve pages (reserve pages to be a copy destination) decreased in a rebuild processing.

Figure 4:
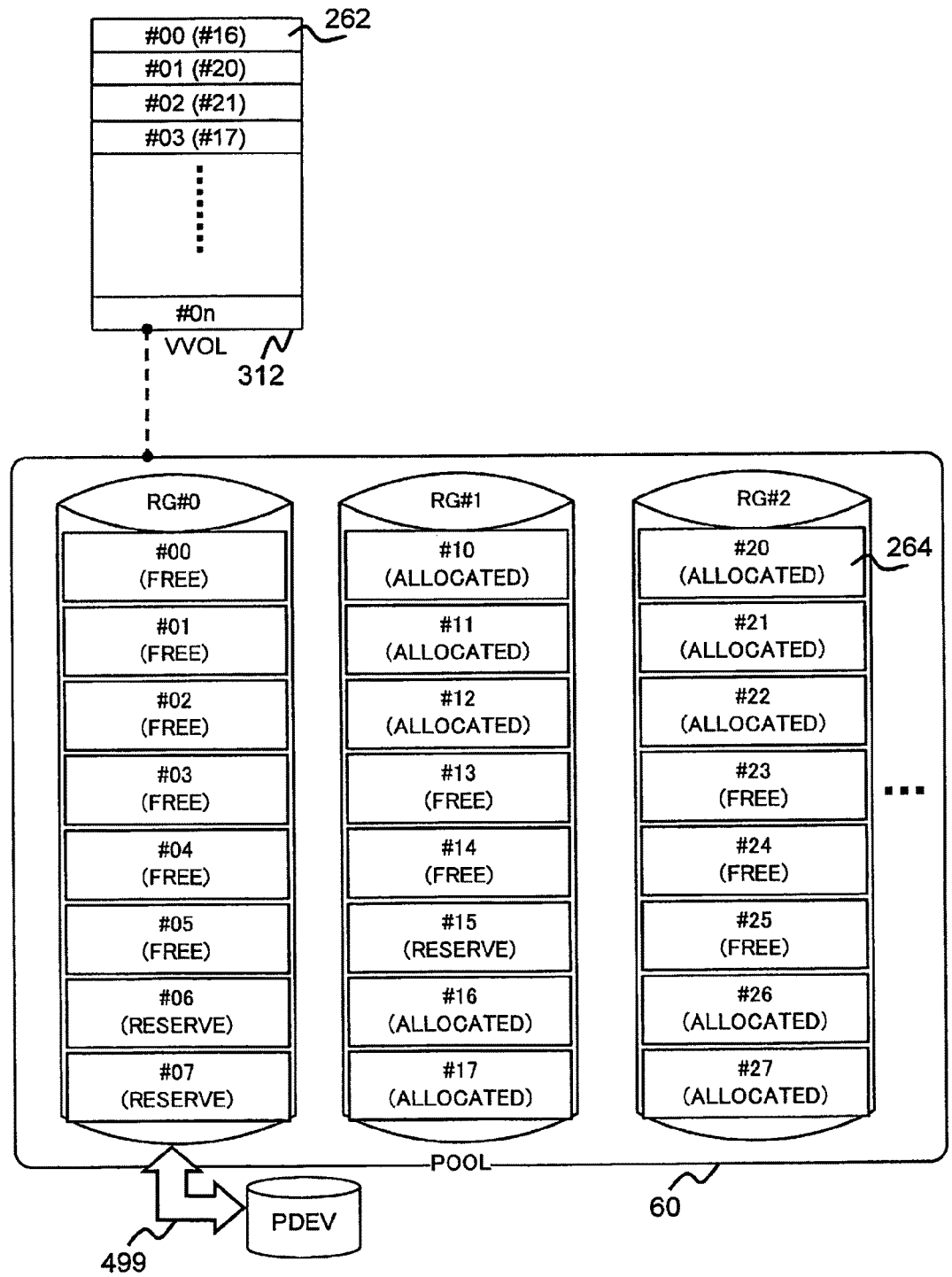
FIG. 4 illustrates a pool including at least two real pages based on a recovered RG (Raid Group).

After a copy of data from all allocated pages based on the defect RG #0 is completed, the defect RG #0 can be recovered to a normal RG #0. For instance, as shown in FIG. 4, a PDEV in which a defect has been detected in the defect RG #0 is exchanged (see a reference number 499), and a storage area based on RG #0 is then formatted. After that, each real page included in the pool 60 and based on RG #0 is changed to a free page or a reserve page. (In brief, real pages based on RG #0 are composed of at lease one free page and at least one reserve page.) After the defect RG #0 is recovered to a normal RG #0, a return processing can be carried out. The return processing includes the following steps (B1) and (B2):

(B1) data that has been copied to a real page (for instance #16) of another RG (for instance #1) in a rebuild processing is returned to any of real pages (for instance #02) based on the recovered RG #0; and (B2) in place of a real page of a return source (for instance #16), a real page of a return destination (for instance #02) is allocated to a virtual page (for instance #00) allocated to a real page of a return source (for instance #16).

By the above processing, it can be expected that an access to a real page in the pool 60 is distributed to a larger number of RGs.

An embodiment in accordance with the present invention will be described below in detail. In the case in which a computer program is a subject in the following, a CPU that executes the computer program caries out processing in practice.

Figure 5:
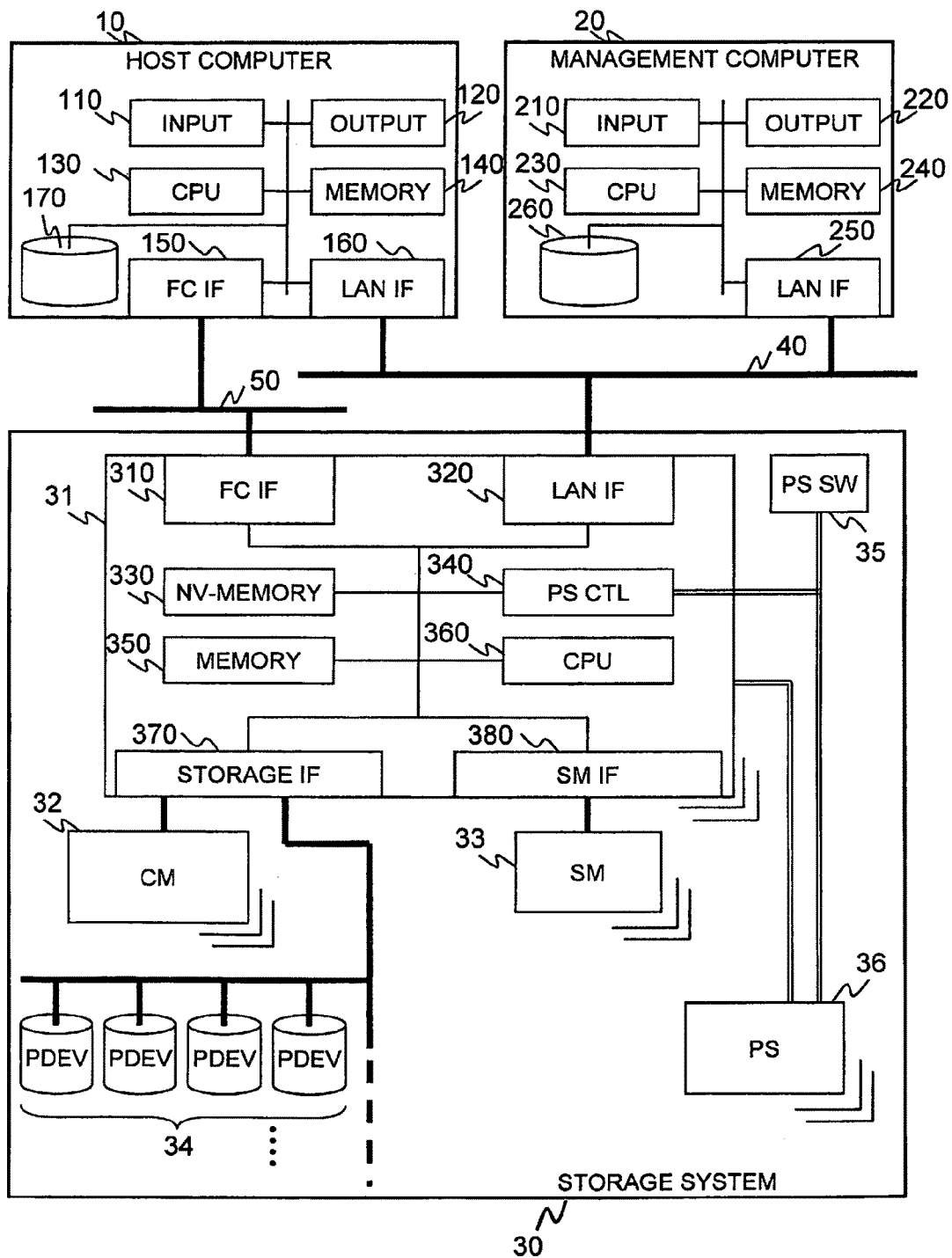
FIG. 5 is a configuration block diagram of a computer system in accordance with an embodiment of the present invention.

FIG. 5 is a configuration block diagram of a computer system in accordance with an embodiment of the present invention.

A host computer 10 is connected to a storage system 30 via an FC (Fibre Channel) network 50 and a LAN (Local Area Network) 40. Moreover, a management computer 20 is connected to the storage system 30 via the LAN 40. The FC network 50 and the LAN 40 can also be a communication network of other types.

The host computer 10 is a computer that accesses a logical volume (target device) supplied from the storage system 30. The host computer 10 is provided with an input device (such as a keyboard and a pointing device) 110, an output device (such as a display device) 120, a CPU 130, a memory 140, an FC IF 150, a LAN IF 160, and an HDD (hard disk drive) 170 for instance as an information processing resource. The FC IF 150 is an interface device for communicating via the FC network 50. The LAN IF 160 is an interface device for communicating via the LAN.

The management computer 20 is a computer that carries out a management related to the storage system 30 (such as setting of a pool and setting of a logical volume). The management computer 20 is provided with an input device (such as a keyboard and a pointing device) 210, an output device (such as a display device) 220, a CPU 230, a memory 240, a LAN IF 250, and an HDD 260 for instance as an information processing resource.

The storage system 30 is provided with a controller 31, a cache memory (CM) 32, a shared memory (SM) 33, a plurality of PDEVs 34, a power source switch (PS SW) 35, and a power source (PS) 36.

The cache memory 32 temporarily stores data that is read from or written to the PDEV 34. The shared memory 33 stores information related to the controller 31 and the PDEV 34.

The power source 36 supplies an electric power to each unit of the storage system 30. The power source switch 35 is a switch for turning on or off the power supply from the power source 36.

The controller 31 controls the storage of data into the PDEV 34. The controller 31 is provided with an FC IF 310, a LAN IF 320, a nonvolatile memory (NV-memory) 330, a power source control unit (PS CTL) 340, a memory 350, a CPU 360, a storage IF 370, and an SM IF 380 for instance.

The FC IF 310 is an interface device for transmitting and receiving data with the host computer 10 via the FC network 50. The LAN IF 320 is an interface device for transmitting and receiving data with the host computer 10 or the management computer 20 via the LAN 40.

The nonvolatile memory 330 is a flash memory for instance. The nonvolatile memory 330 stores a computer program that is executed by the CPU 360 and configuration information related to the storage system 30.

The power source control unit 340 controls an electric power that is supplied from the power source 36.

The memory 350 is a volatile memory (such as a RAM (Random Access Memory) for instance. The memory 350 stores data and/or a computer program that are read from at least one of the nonvolatile memory 330, the shared memory 33, and the cache memory 32.

The CPU 360 reads a computer program from the nonvolatile memory 330 to the memory 350 and executes the processing specified in the program.

The storage IF 370 is an interface device for transmitting and receiving data with the PDEV 34 and the cache memory 32.

The SM IF 380 is an interface device for transmitting and receiving data with the shared memory 33.

Figure 6:
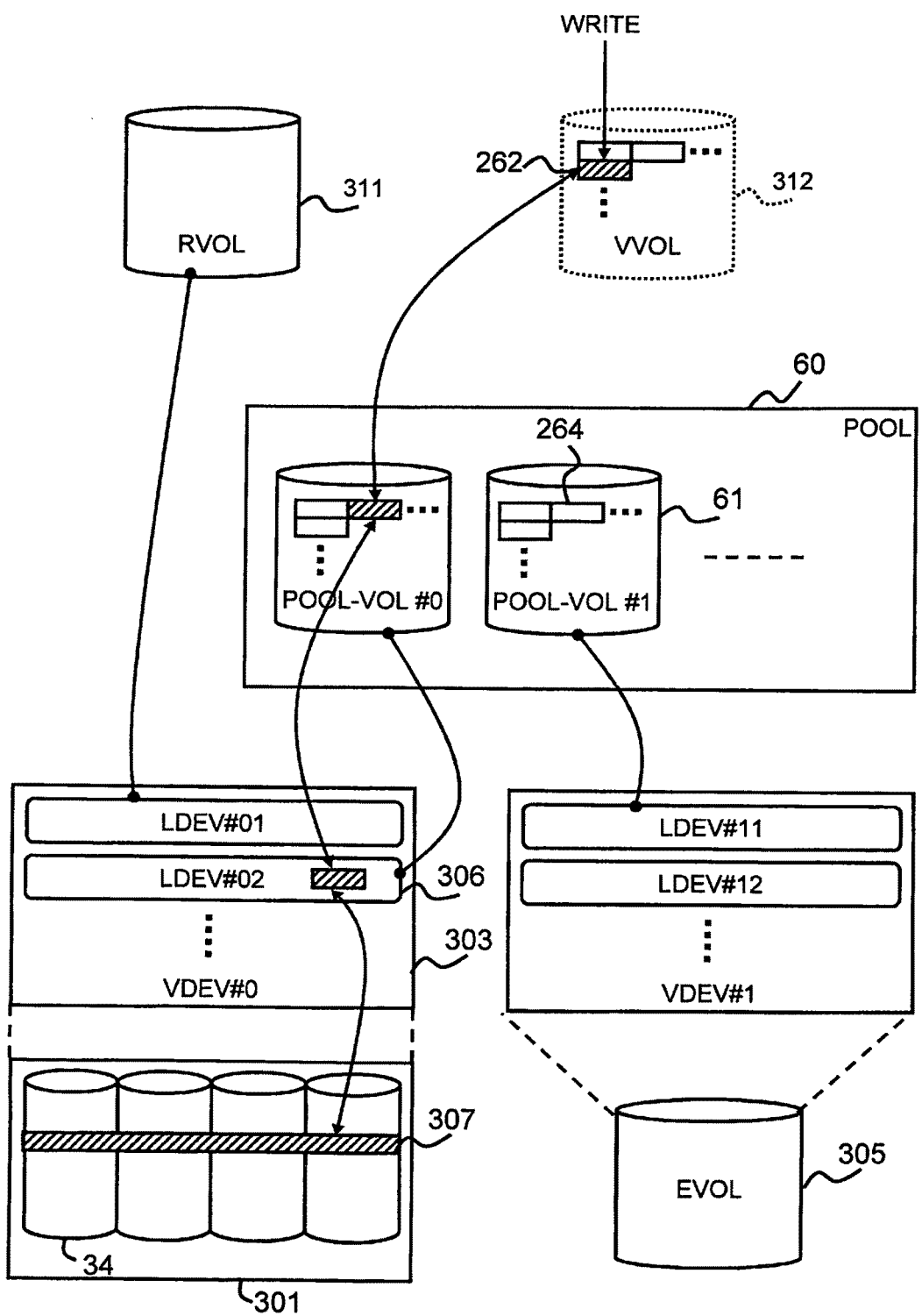
FIG. 6 shows a hierarchy of a storage area in a computer system in accordance with an embodiment of the present invention.

FIG. 6 shows a hierarchy of a storage area in the computer system in accordance with an embodiment of the present invention. The storage area will be described below in the order from the lower hierarchy.

The computer system includes a RAID group 301. As described above, the RAID group 301 is composed of a plurality of PDEVs 34, and a stripe line 307 is disposed over the plurality of PDEVs 34.

The computer system includes an EVOL 305. The EVOL 305 is an abbreviation of an external volume and is a logical volume based on a storage resource in an external storage system (so-called external connection storage system) not shown. The storage resource is a RAID group or a logical volume based on a RAID group for instance. In the case in which a data input/output is carried out for the EVOL 305, the data input/output is carried out for a storage resource in an external connection storage system, which is a basis of the EVOL 305.

The computer system includes a VDEV 303. The VDEV 303 is a virtual storage resource based on the RAID group 301 or the EVOL 305. A plurality of LDEVs 306 is formed in the VDEV 303 by partitioning a storage space of the VDEV 303. The VDEV 303 can also be one LDEV 306. Hereafter, a VDEV based on the RAID group 301 is referred to as a VDEV of the first kind, and a VDEV based on the EVOL 305 is referred to as a VDEV of the second kind in some cases.

The computer system includes a pool 60. The pool 60 is composed of a plurality of pool volumes. The pool volume 61 is associated with any of the LDEV. The pool volume 61 is not associated with a target device specified by the host computer 10. The pool volume 61 is associated with an LDEV in the VDEV of the first kind or an LDEV in the VDEV of the second kind. The pool volume 61 is composed of a plurality of real pages 264. In the embodiment in accordance with the present invention, the real page 264 and the stripe line 307 are corresponded to each other on a one-on-one basis. Data stored into the real page 264 is stored into the stripe line 307 corresponding to the real page 264. In the following descriptions, data stored into one stripe line 307 is referred to as a data unit, and therefore data stored into one real page is also referred to as a data unit in some cases. The real page 264 can also be corresponded to a plurality of stripe lines 307.

The computer system includes a logical volume associated with a target device. As a logical volume of that kind, a real volume (RVOL) 311 and a virtual volume (VVOL) 312 are mentioned for instance. The RVOL 311 is a logical volume based on an LDEV (#01) in the VDEV (#0) of the first kind, that is, a substantive logical volume. On the other hand, the VVOL 312 is a logical volume that is not based on the VDEV 303, that is, a virtual logical volume. One pool 60 is corresponded to one VVOL 312, and a free page in the pool 60 that is corresponded to the VVOL 312 is allocated to a virtual page of the VVOL 312.

The host computer 10 transmits an I/O request (a write request or a read request) that specifies a target device to the storage system 30. As described above, the RVOL 311 or the VVOL 312 is associated with the target device. In the case in which a write request that specifies a target device associated with the VVOL 312 is received, the following processing is carried out for instance according to a hierarchical example of the storage area shown in FIG. 6. More specifically, as shown by hatchings, a free page 264 is selected from the pool 60, the selected free page 264 is allocated to a write destination virtual page (a virtual page specified by the write request) 262, and a write target data unit is written to the allocated free page 264. The case in which a data unit is written to the real page 264 is that a data unit is written to the LDEV #02 associated with the pool volume #0 provided with the real page 264. Since the LDEV #02 is an LDEV in the VDEV of the first kind, a data unit that is written to the LDEV #02 is actually written to the stripe line 307 that is corresponded to the allocated real page 264 in the RAID group 307.

In the case in which data is copied from an allocated page based on the defect RG to a reserve page, the data is created as described below. A plurality of data elements are read from a stripe line that is corresponded to the allocated page of the copy source, and a data element stored into a PDEV in which a defect occurs is restored based on the plurality of data elements. The data composed of a plurality of read data elements and the restored data element is then copied to a reserve page. In the case in which a RAID level of an RG that is a basis of the defect RG or a reserve page of a copy destination is a RAID level in which a parity is created for instance, it is not necessary that data to be copied includes a parity. This is because a parity is created again in the case in which data is copied.

Figure 7:
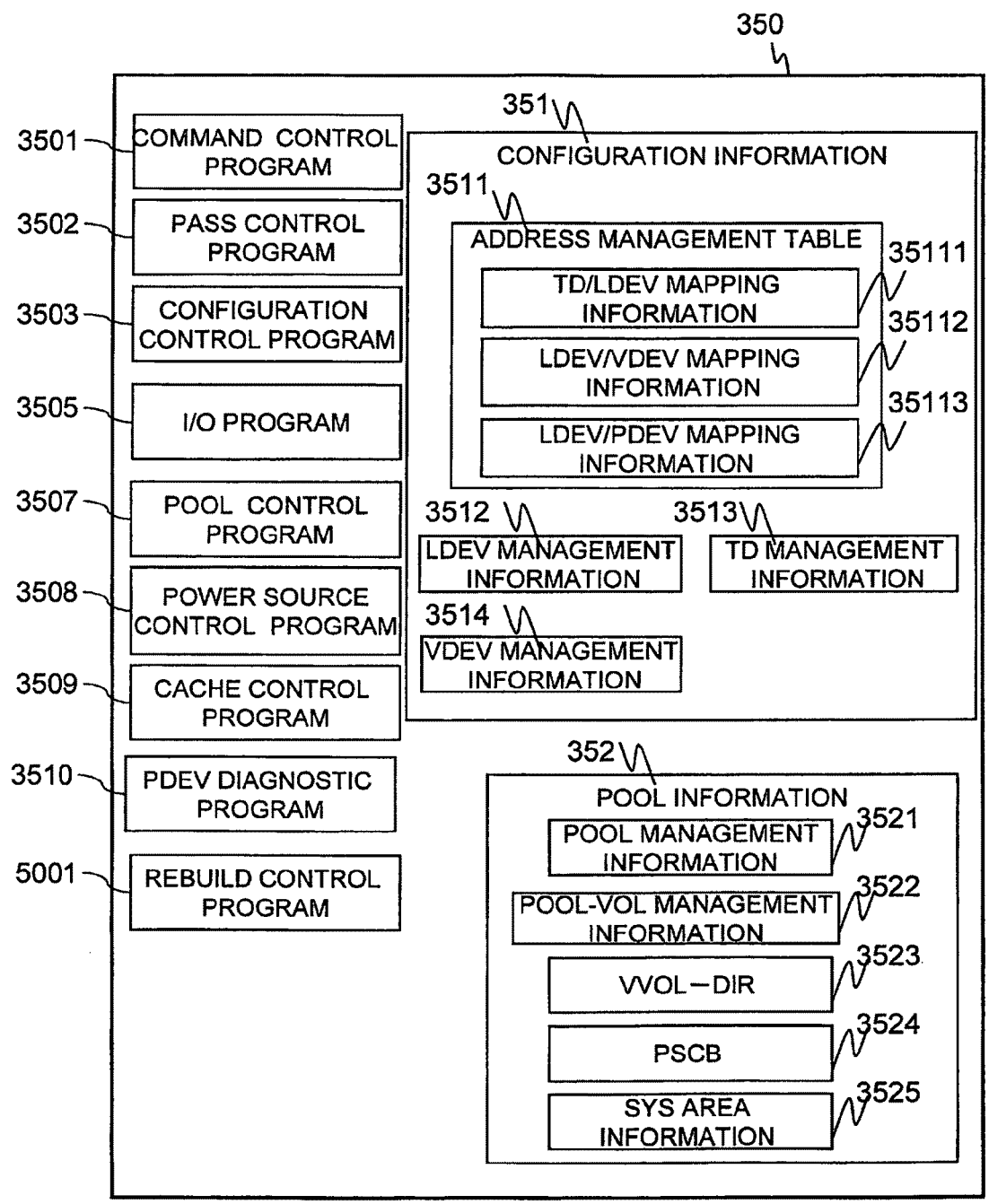
FIG. 7 shows a program and information that are stored into a memory 350 of a controller 31.

FIG. 7 shows a program and information that are stored into the memory 350 of the controller 31.

The memory 350 stores a command control program 3501, a pass control program 3502, a configuration control program 3503, an I/O program 3505, a pool control program 3507, a power source control program 3508, a cache control program 3509, a PDEV diagnostic program 3510, a rebuild control program 5001, configuration information 351, and pool information 352 for instance.

The command control program 3501 interprets a command received from the host computer 10 or the management computer 20, and calls any of other computer programs 3503 to 3510 that can process the command. For instance, the I/O program 3505 is called in the case in which the received command is an I/O command, and the pool control program 3507 is called in the case in which the received command is a pool setting command.

The pass control program 3502 sets a pass between the host computer 10 and a target device according to a command from the management computer 20.

The configuration control program 3503 updates the configuration information 351 according to a command from the management computer 20.

The I/O program 3505 carries out a write process or a read process according to an I/O command from the host computer 10.

The pool control program 3507 sets or updates the pool information 352.

The power source control program 3508 controls ON/OFF of the power source 36.

The cache control program 3509 controls a storage area of the cache memory 32.

The PDEV diagnostic program 3510 diagnoses a state of the PDEV 34. For instance, in the case in which a defect occurs in any of PDEVs 34, a defect of the PDEV 34 is detected by the PDEV diagnostic program 3510.

The rebuild control program 5001 carries out a rebuild process described later with a detection of a defect of the PDEV 34.

The configuration information 351 is information related to the configuration of the storage system 30. The configuration information 351 includes an address management table 3511, the LDEV management information 3512, the target device (TD) management information 3513, and the VDEV management information 3514 for instance. The address management table 3511 includes the target device/LDEV mapping information 35111, the LDEV/VDEV mapping information 35112, and the LDEV/PDEV mapping information 35113 (those of the information will be described later with reference to FIG. 10). The LDEV management information 3512 is information related to LDEV. The target device management information 3513 is information related to a target device. The VDEV management information 3514 is information related to a VDEV.

The pool information 352 is information related to the pool 60. The pool information 352 includes the pool management information 3521, the POOL-VOL management information 3522, a VVOL-DIR 3523, a PSCB (POOL Slot Control Brock) 3524, and the SYS area information 3525. The pool management information 3521 includes a setting of a pool 60. The POOL-VOL management information 3522 is information related to a pool volume. The VVOL-DIR 3523 includes information related to an LDEV allocated to a pool volume. The PSCB 3524 is information related to a real page, and exists for every real page. The SYS area information 3525 is information related to an LDEV into which management information such as the configuration information 351 and the pool information 352 is stored.

The VDEV management information 3514, the LDEV management information 3512, the address management table 3511, the pool management information 3521, and the target device management information 3513 will be described in detail in the following.

Figure 8:
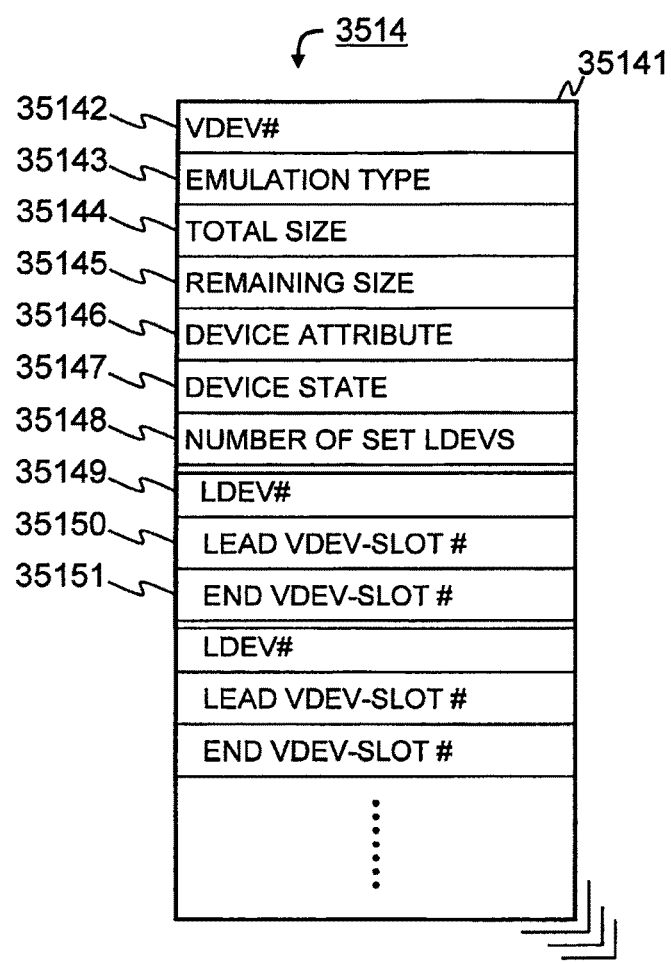
FIG. 8 is a configuration diagram of the VDEV management information 3514.

FIG. 8 is a configuration diagram of the VDEV management information 3514.

The VDEV management information 3514 is composed of VDEV specific information 35141 prepared for every VDEV. FIG. 8 shows the VDEV specific information 35141 corresponded to a VDEV (hereafter referred to as a target VDEV in the descriptions of FIG. 8). The VDEV specific information 35141 includes a VDEV #35142, an emulation type 35143, a total size 35144, a remaining size 35145, a device attribute 35146, a device state 35147, the number of set LDEVs 35148, an LDEV #35149, a lead VDEV-SLOT #35150, and an end VDEV-SLOT #35151 for instance.

The VDEV #35142 is an identifier of the target VDEV.

The emulation type 35143 is an identifier of an emulation type of the target VDEV.

The total size 35144 is information that indicates a size (a storage capacity) of the target VDEV.

The remaining size 35145 is information that indicates a size of an unused storage space section (a storage space section in which an LDEV is not set) of the target VDEV.

The device attribute 35146 is an identifier of an attribute of the target VDEV. For instance, the device attribute 35146 is an identifier that indicates a VDEV of the first kind in the case in which the target VDEV is a VDEV of the first kind, and the device attribute 35146 is an identifier that indicates a VDEV of the second kind in the case in which the target VDEV is a VDEV of the second kind.

The device state 35147 is an identifier that indicates a state of the target VDEV. As a state of the target VDEV, there are a normal state, a block state, and a defect block state. The block state indicates a block caused by a factor other than an occurrence of a defect. The defect block state indicates a block caused by an occurrence of a defect in any of PDEVs 34.

The number of set LDEVs 35148 is information that indicates the total number of LDEVs set to the target VDEV.

The set of the LDEV #35149, the lead VDEV-SLOT #35150, and the end VDEV-SLOT #35151 is information prepared for every LDEV set to the target VDEV. The information for a set will be described in the following. The LDEV corresponded to a set is referred to as a target LDEV in this paragraph. The LDEV #35149 is an identifier of the target LDEV. The lead VDEV-SLOT #35150 is an identifier of a physical lead slot (storage area) of the target LDEV. The end VDEV-SLOT #35151 is an identifier of a physical final slot of the target LDEV. The slot is a storage area corresponded to a real page for instance as shown in FIG. 6. For instance, at least one slot is corresponded to one real page.

Figure 9:
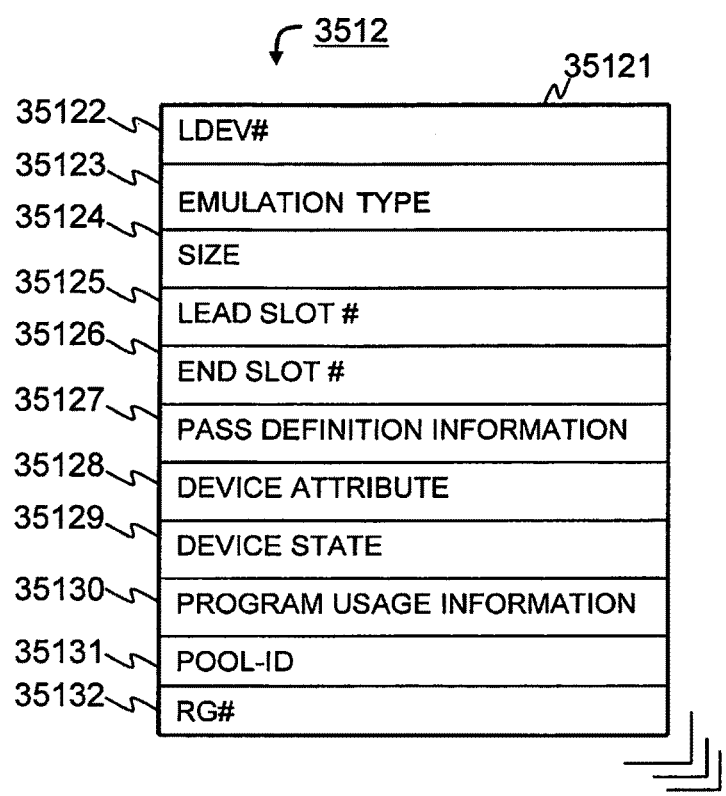
FIG. 9 is a configuration diagram of the LDEV management information 3512.

FIG. 9 is a configuration diagram of the LDEV management information 3512.

The LDEV management information 3512 is composed of LDEV specific information 35121 prepared for every LDEV. FIG. 9 shows the LDEV specific information 35121 corresponded to an LDEV (hereafter referred to as a target LDEV in the descriptions of FIG. 9).

The LDEV specific information 35121 includes an LDEV #35122, an emulation type 35123, a size 35124, a lead slot #35125, an end slot #35126, pass definition information 35127, a device attribute 35128, a device state 35129, program usage information 35130, a POOL-ID 35131, and an RG #35132.

The LDEV #35122 is an identifier of the target LDEV.

The emulation type 35123 is an identifier of an emulation type of the target LDEV.

The size 35124 is information that indicates a size (a storage capacity) of the target LDEV.

The lead slot #35125 is an identifier of the lead slot of the target LDEV.

The end slot #35126 is an identifier of the final slot of the target LDEV.

The pass definition information 35127 is an identifier of a pass that is defined by the host computer 10 and that is to a logical volume (a target device) to which the target LDEV is allocated.

The device attribute 35128 is an identifier of an attribute of the target LDEV. The identifier (that is, an attribute of the target LDEV) depends on that the target LDEV is allocated to which of a VDEV of the first kind and a VDEV of the second kind, and whether or not the target LDEV is allocated to the pool volume 61.

The device state 35129 is an identifier that indicates a state of the VDEV including the target LDEV.

The program usage information 35130 is an identifier of a program in the case in which the target LDEV is being processed by any of computer programs.

The POOL-ID 35131 is information that is set in the case in which the target LDEV is allocated to the pool volume 61. The POOL-ID 35131 is an identifier of the pool 60 including the pool volume 61.

The RG #35132 is an identifier of an RG that is a basis of the target LDEV.

Figure 10:
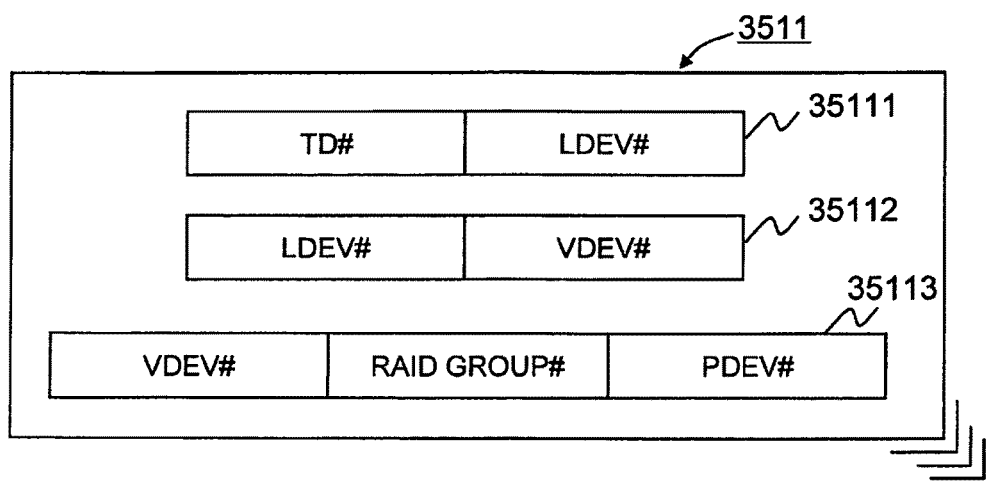
FIG. 10 is an illustration for the address management table 3511.

FIG. 10 is an illustration for the address management table 3511.

As described above, the address management table 3511 includes the target device/LDEV mapping information 35111, the LDEV/VDEV mapping information 35112, and the VDEV/PDEV mapping information 35113.

The target device/LDEV mapping information 35111 stores an address of the target device (the logical volume) and an address of the LDEV.

The LDEV/VDEV mapping information 35112 stores a correspondence of an address of the LDEV and an address of the VDEV.

The VDEV/PDEV mapping information 35113 stores a correspondence of an address of the VDEV and an address of the PDEV. In the case in which the VDEV is a VDEV of the first kind, an RG# of the RG that is based of the VDEV is also stored.

The programs of many kinds such as an I/O program 3505 and a rebuild control program can refer to the address management table 3511 to recognize an address of an LDEV corresponded by an address of the target device, an address of a VDEV corresponded by the address of the LDEV, and an address of a RAID group corresponded by the address of the VDEV.

Figure 11:
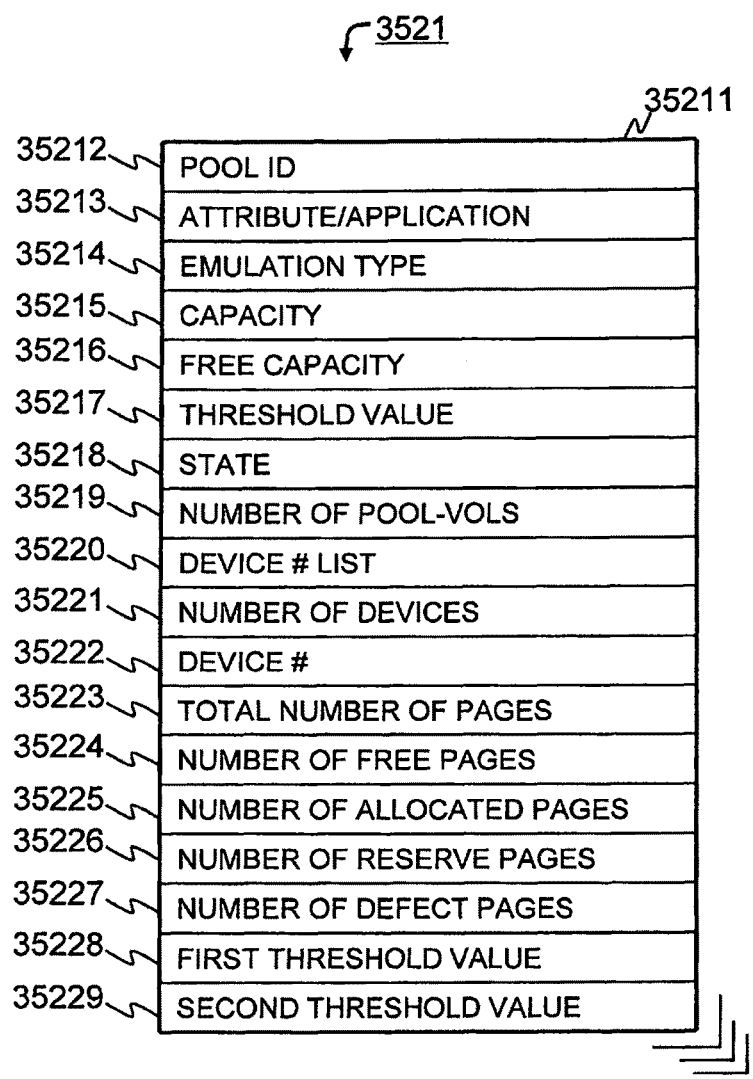
FIG. 11 is a configuration diagram of the pool management information 3521.

FIG. 11 is a configuration diagram of the pool management information 3521.

The pool management information 3521 is composed of pool specific information 35211 prepared for every pool. FIG. 11 shows the pool specific information 35211 corresponded to a pool (hereafter referred to as a target pool in the descriptions of FIG. 11).

The pool specific information 35211 includes a POOL-ID 35212, an attribute/application 35213, an emulation type 35214, a capacity 35215, a free capacity 35216, a threshold value 35217, a state 35218, the number of POOL-VOLs 35219, a device # list 35220, the number of devices 35221, a device #35222, the total number of pages 35223, the number of free pages 35224, the number of allocated pages 35225, the number of reserve pages 35226, the number of defect RG pages 35227, a first threshold value 35228, and a second threshold value 35229 for instance.

The POOL-ID 35212 is an identifier of the target pool.

The attribute/application 35213 is an identifier that indicates an attribute and an application of the target pool. The attribute is in a mod e of a concatenation of PSCB 3524. The application is an application of an operational mode such as a snapshot and a SYS area.

The emulation type 35214 is an identifier of the emulation type of the target pool.

The capacity 35215 is information that indicates the total capacity of the target pool.

The free capacity 35216 is information that indicates a capacity of an unused area of the pool.

The threshold value 35217 is the maximum data storage capacity permitted by the target pool.

The state 35218 is a current state of the target pool. As the state, there can be mentioned for instance a state in a definition, a state in an extension, and an effective state.

The number of POOL-VOLs 35219 is the total number of pool volumes that configure the target pool.

The device # list 35220 is a list of the LDEV# of at least one LDEV that is allocated to at least one pool volume that configures the target pool, respectively.

The number of devices 35221 is information that indicates the number of the pool volumes to which the LDEV in the VDEV of the second kind is allocated among the pool volumes in the target pool.

The device #35222 is a list of the LDEV # of the LDEV in the VDEV of the second kind among LDEVs that are allocated to the pool volumes in the target pool.

The total number of pages 35223 is information that indicates the total number of real pages that configure the target pool.

The number of free pages 35224 is information that indicates the number of free pages for the target pool.

The number of allocated pages 35225 is information that indicates the number of allocated pages for the target pool.

The number of reserve pages 35226 is information that indicates the number of reserve pages for the target pool.

The number of defect pages 35227 is information that indicates the number of defect pages for the target pool. The defect page is a real page based on the defect RG.

The first threshold value 35228 is a threshold value that is used for judging whether there is a sufficient unused storage capacity in the target pool or not. More specifically, in the case in which the value of {(the total storage capacity of allocated pages/the total size of the target pool)×100(%)} exceeds the first threshold value 35228, it is judged that there is a sufficient unused storage capacity in the target pool.

The second threshold value 35229 is a threshold value that is used for judging whether the real pages that can be copy destinations are insufficient in the target pool or not. More specifically, for instance, in the case in which the value of {(the total number of allocated pages based on the RG other than the defect RG/the total number of unallocated pages that can be copy destinations based on the RG other than the defect RG)×100(%)} exceeds the second threshold value 35229, it is judged that the unallocated pages (real pages) that can be copy destinations are insufficient in the target pool. At least one of the first threshold value 35228 and the second threshold value 35229 can be set by an administrator from the management computer 20.

Figure 12:
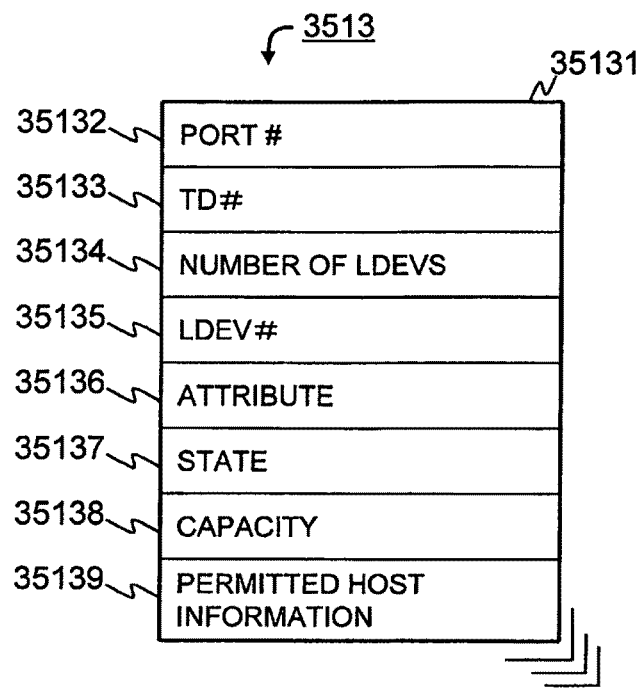
FIG. 12 is a configuration diagram of the target device management information 3513.

FIG. 12 is a configuration diagram of the target device management information 3513.

The target device management information 3513 is composed of target device specific information 35131 prepared for every target device. FIG. 12 shows the target device specific information 35131 corresponded to a target device (hereafter referred to as a target TD in the descriptions of FIG. 12).

The target device specific information 35131 includes a port #35132, a target device #35133, the number of LDEVs 35134, an LDEV #35135, an attribute 35136, a state 35137, a capacity 35138, and permitted host information 35139 for instance.

The port #35132 is an identifier of the port that is associated with the target TD (the port included in the FC IF 310).

The target device number 35133 is an identifier of the target TD.

The number of LDEVs 35134 is information that indicates the number of LDEVs that are allocated to the target TD (the logical volume).

The LDEV number 35135 is a list of the LDEV # of an LDEV that is allocated to the target TD (the logical volume).

The attribute 35136 is an identifier that indicates an attribute of the target TD. The identifier (that is, an attribute of the target TD) depends on whether the target TD is an RVOL or a VVOL.

The state 35137 is an identifier that indicates a state of the VDEV corresponded to the target TD.

The capacity 35138 is a capacity of the target TD (a capacity recognized by the host computer 10).

The permitted host information 35139 is an identifier of the host computer 10 to which an access to the target TD is permitted.

Figure 13:
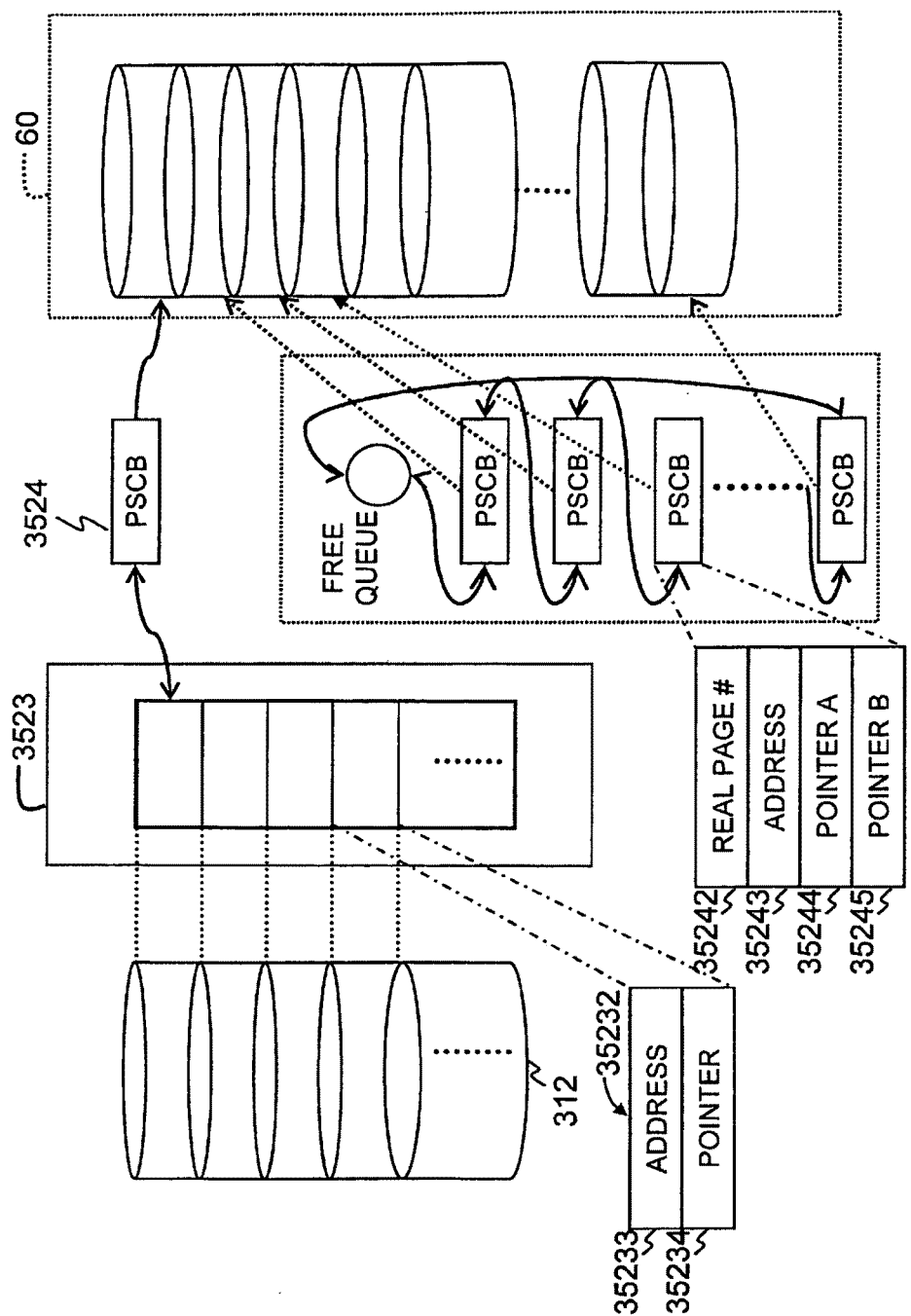
FIG. 13 is an illustration of a VVOL-DIR 3523 and a PSCB 3524.

FIG. 13 is an illustration of a VVOL-DIR 3523 and a PSCB 3524.

The VVOL-DIR 3523 is the information related to each virtual page 262 that configures the VVOL 312. More specifically, the VVOL-DIR 3523 is provided with an entry 35232 for every virtual page 262. The entry 35232 includes the information (address) 35233 that indicates an address of a virtual page corresponded to the entry 35232 and a pointer (pointer) 35234 to the PSCB 3524 corresponded to a real page allocated to the virtual page.

The PSCB 3524 is the information related to a real page 264 that configures the pool 60. More specifically, the PSCB 3524 includes an identifier (a real page #) 35242 of a real page corresponded to the PSCB 3524, information (address) 35243 that indicates the location of the real page in the pool 60, a pointer (pointer A) 35244 to the PSCB 3524, located immediately before the PSCB 3524, and a pointer (pointer B) 35245 to the PSCB 3524, located immediately after the PSCB 3524. The PSCB 3524 is managed by queue. In the case in which the PSCB 3524 stays at the top (in the case in which another PSCB 3524 is not connected immediately before the PSCB 3524), a value of the pointer A 35244 is an invalid value. In the case in which the PSCB 3524 stays on the tail (in the case in which another PSCB 3524 is not connected immediately after the PSCB 3524), a value of the pointer B 35245 is an invalid value.

In the case in which an access (write or read) occurs in a virtual page 262, a real page 264 allocated to the virtual page 262 can be specified by the PSCB pointer 35234 in the entry 35232 corresponded to the virtual page 262. The location of the real page 264 in the pool 60 can be specified by the PSCB 3524 corresponded to the real page 264.

FIG. 14 shows a kind of a queue that is managed by the storage system 30.

There are a free queue 1401F, a reserve queue 1401R, an allocated queue 1401A, a defect queue 1401D, and an unused queue 1401U. Each kind of queues 1401F, 1401R, 1401A, 1401D, and 1401U is prepared for every RAID group. Each kind of queues 1401F, 1401R, 1401A, 1401D, and 1401U is a line of the PSCB 3524. More specifically, the free queue 1401F is a line of the PSCB 3524 corresponded to a free page. The reserve queue 1401R is a line of the PSCB 3524 corresponded to a reserve page. The allocated queue 1401A is a line of the PSCB 3524 corresponded to an allocated page. The defect queue 1401D is a line of the PSCB 3524 corresponded to a defect page. The unused queue 1401U is a line of the PSCB 3524 corresponded to a real page that is not any of a free page, a reserve page, an allocated page, and a defect page.

For the I/O program 3505, in the case in which a free page is allocated to a write destination virtual page for instance, the PSCB 3524 corresponded to the free page is detached from the free queue 1401F corresponded to the RG that is a basis of the free page, and is connected to the tail of the allocated queue 1401A corresponded to the RG.

Moreover, in the case in which the PDEV diagnostic program 3510 detects a defect of a PDEV 34 for instance, the PDEV diagnostic program 3510 makes the RG (the defect RG) provided with the PDEV 34 in which a defect has been detected be in a degenerate state. More specifically, the PDEV diagnostic program 3510 updates a state corresponded to the defect RG in a table that records a state of each RG (not shown) to a degenerate state.

The rebuild control program 5001 carries out the following steps (Q1) to (Q5) in the rebuild processing in the case in which it is detected that the defect RG is in a degenerate state:

(Q1) updating the states of the free queue 1401F and the reserve queue 1401R corresponded to the defect RG to a defect state;

(Q2) moving the allocated queue 1401A corresponded to the defect RG to a defect queue corresponded to the defect RG, and moving the free queue 1401F corresponded to the defect RG to a defect queue corresponded to the defect RG (however, it is also possible that the step (Q2) is not carried out);

(Q3) uniformly distributing data in a plurality of allocated pages based on the defect RG to a reserve page based on a plurality of other RGs that are not in a degenerate state (that is, the numbers of reserve pages of the copy destinations for other RGs are equivalent to each other);

(Q4) moving the PSCB 3524 corresponded to the reserve page of the copy destination among the PSCB 3524 connected to each reserve queue to an allocated queue corresponded to the RG corresponded to each reserve queue; and (Q5) moving all the PSCB 3524 in a defect queue corresponded to the defect RG to the unused queue 1401U.

In the case in which the PSCB 3524 corresponded to all real pages based on an RG is on the unused queue 1401U, the RG can be eliminated from the storage system 30.

In accordance with the above move of the PSCB 3524 between queues, information 35224, 35225, 35226, and 35227 for the pool specific information 35211 corresponded to the pool 60 are updated on a timely basis.

Figure 15:
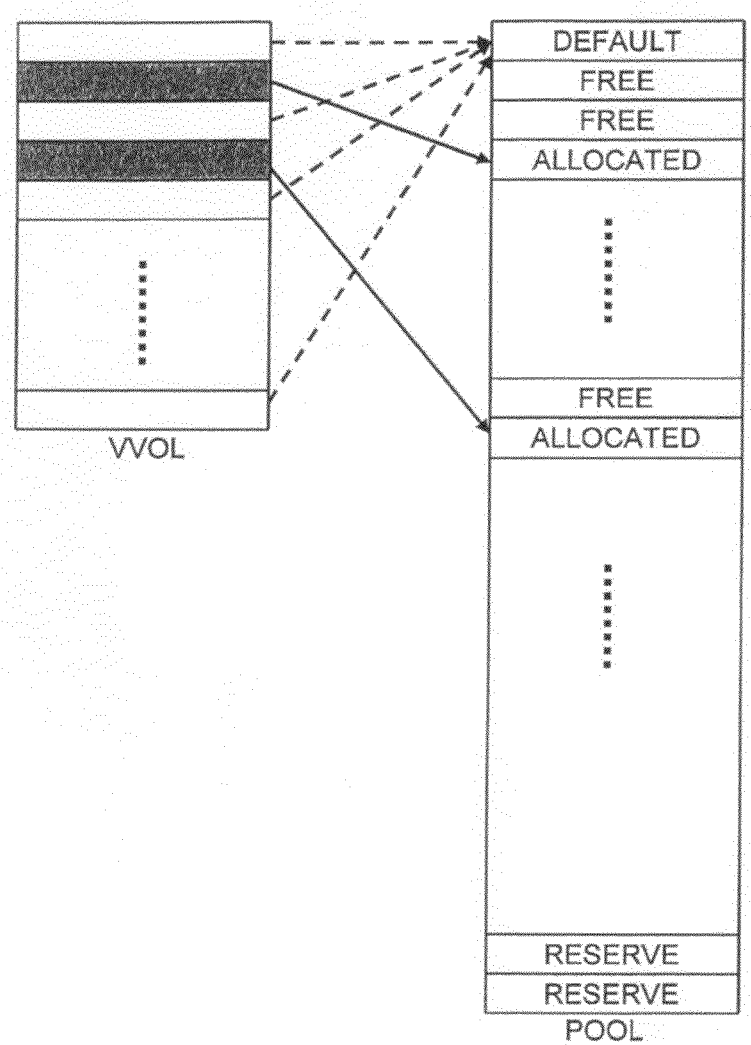
FIG. 15 illustrates an allocation to all unallocated virtual pages in a VVOL and a prescribed real page in a pool.

In the embodiment in accordance with the present invention, as shown in FIG. 15, a default page is allocated to all of virtual pages to which a real page is not allocated (hereafter referred to as unallocated virtual pages). Consequently, in the case in which a write does not occur in any of virtual pages of VVOL, a default page is allocated to all virtual pages. In the case in which a write occurs in any of virtual pages, a free page is allocated to the virtual page in place of a default page (in other words, an allocation of a default page to a virtual page is canceled).

The default page is a real page into which data composed of bits indicating zero (hereafter referred to as zero data) has been recorded in advance for instance. Consequently, in the case in which a read request in which any of unallocated virtual pages is a read source is received from the host computer 10, the I/O program 3505 reads zero data from the default page corresponded to the unallocated virtual page of the read source and transmits the read zero data to the host computer 10.

One default page can be prepared for every RG. In the case in which the RG that is a basis of the default page allocated to all of unallocated virtual pages is in a degenerate state, a default page based on an RG that is not in a degenerate state can also be allocated to the all unallocated virtual pages in place of the above default page.

One default page can be prepared for every pool. In the case in which the RG that is a basis of the default page is in a degenerate state and a rebuild processing is carried out, a reserve page of the copy destination of the default page can also be a default page. In other words, the reserve page of the copy destination can also be allocated to all the unallocated virtual pages.

Many kinds of processing that is carried out in the embodiment in accordance with the present invention will be described below.

Figure 16:
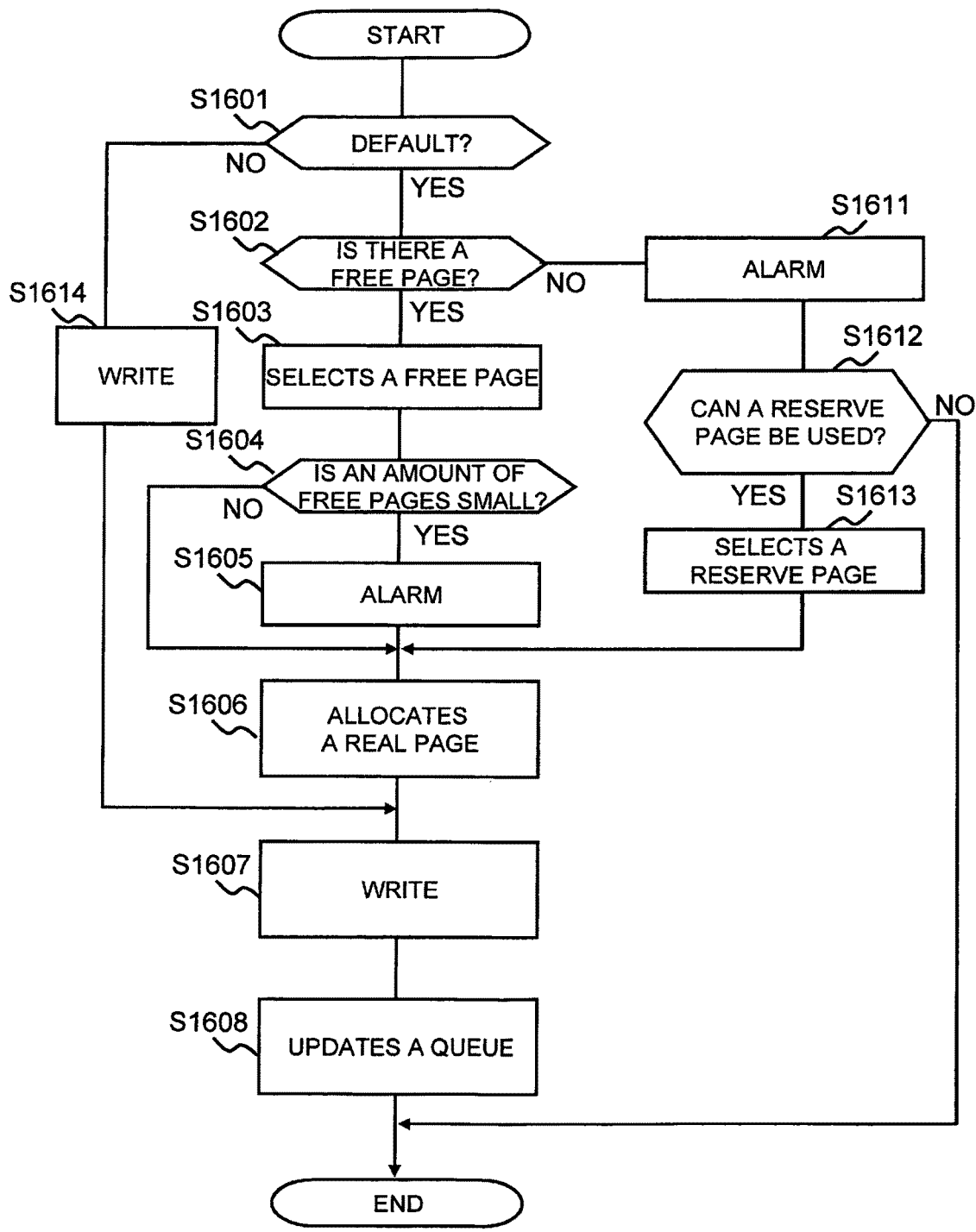
FIG. 16 shows a flow of a write processing.

FIG. 16 shows a flow of a write processing. In the descriptions with reference to FIG. 6, a VVOL provided with a write destination virtual page is referred to as a write destination VVOL.

In the case in which a write request is received, the I/O program 3505 temporarily writes data in accordance with the write request to the cache memory 32. The I/O program 3505 then judges whether a real page allocated to a write destination virtual page specified based on the write request is a default page or not (S1601). This judgment can be carried out based on the real page #35242 or the address 35243 in the PSCB 3524 corresponded to the real page for instance.

In the case in which a result of the judgment of the S1601 is negative (S1601: NO), the I/O program 3505 writes data to an allocated page that has been allocated to the write destination virtual page (S1614).

In the case in which a result of the judgment of the S1601 is positive (S1601: YES), the I/O program 3505 judges whether the pool 60 has a free page or not (S1602). This judgment can be carried out based on the pool specific information 35211 of a pool corresponded to the write destination VVOL or based on whether a free queue has the PSCB or not for instance.

In the case in which a result of the judgment of the S1602 is negative (S1602: NO), the I/O program 3505 gives an alarm to the host computer 10 and/or the management computer 20 (S1611). The I/O program 3505 then judges whether a reserve page can be used as a free page or not (S1612). This judgment can be carried out based on whether or not the PSCB corresponded to the reserve page includes information indicating that the reserve page can be used as a free page for instance. In the case in which a result of the judgment of the S1612 is negative (S1612: NO), the processing is terminated. In the case in which a result of the judgment of the S1612 is positive (S1612: YES), the I/O program 3505 selects a reserve page (S1613).

On the other hand, in the case in which a result of the judgment of the S1602 is positive (S1602: YES), the I/O program 3505 selects a free page (S1603). The I/O program 3505 then judges whether the amount of free pages is small or not (S1604). This judgment can be carried out based on whether or not the value of {(the total storage capacity of allocated pages/the total size of the pool corresponded to the write destination VVOL)×100(%)} exceeds the first threshold value 35228 for the pool corresponded to the write destination VVOL. In the case in which a result of the judgment of the S1604 is positive (S1604: YES), the I/O program 3505 gives an alarm to the host computer 10 and/or the management computer 20 (S1605).

After the step (S1604: NO), S1605, or S1613, the I/O program 3505 allocates a real page selected in S1603 or S1613 to a write destination virtual page (S1606). The I/O program 3505 then writes a write target data unit that has been stored into the cache memory 32 to the allocated real page. The I/O program 3505 moves the PSCB corresponded to the allocated real page to an allocated queue corresponded to the RG that is a basis of the real page (S1608).

Figure 17:
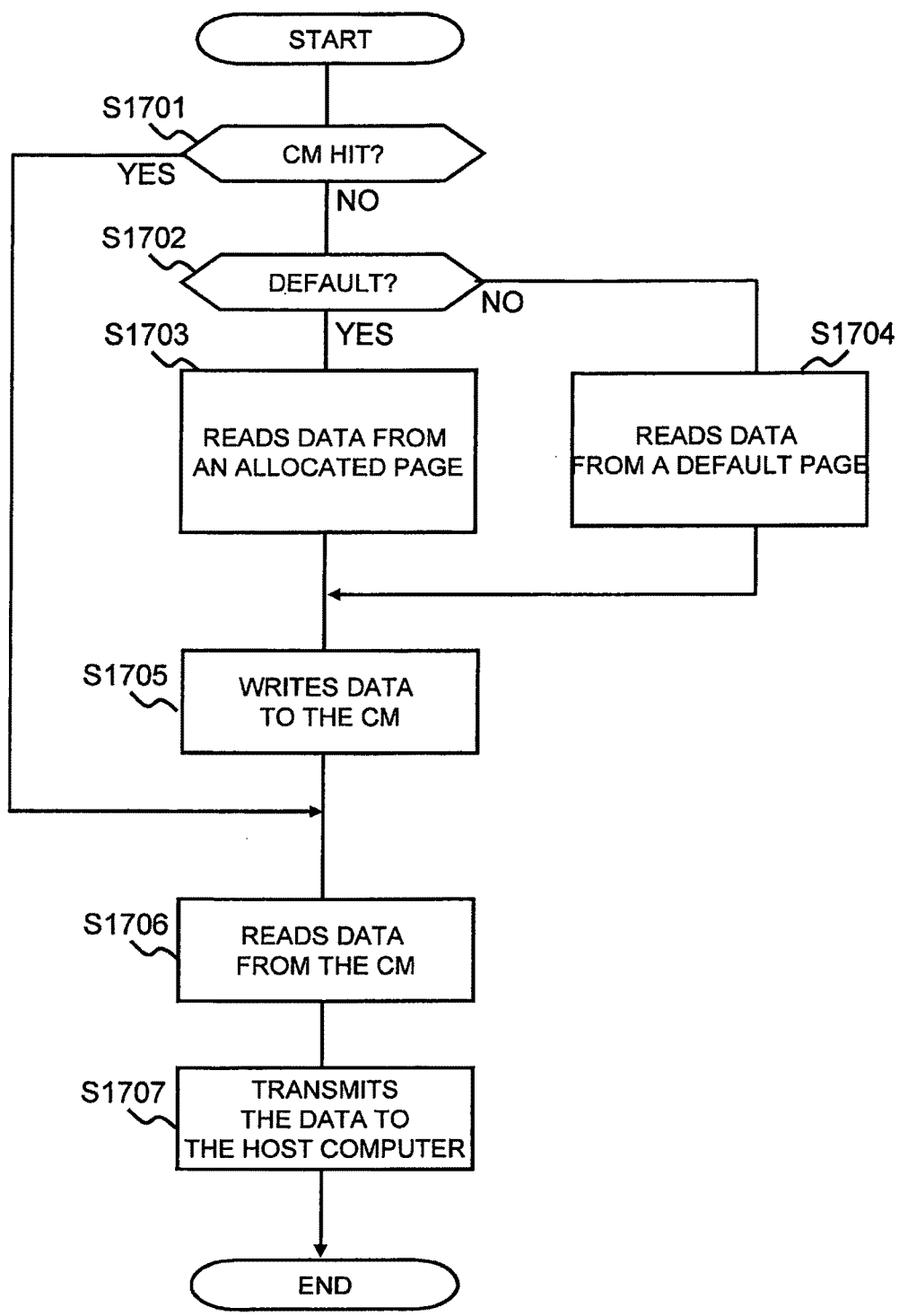
FIG. 17 shows a flow of a read processing.

FIG. 17 shows a flow of a read processing.

In the case in which a read request is received, the I/O program 3505 judges whether a CM hit succeeds or not, that is, whether a read target data exists in the cache memory 32 or not (S1701).

In the case in which a result of the judgment of the S1701 is positive (S1701: YES), the I/O program 3505 reads data from the cache memory 32 (S1706), and transmits the data to the host computer 10 (S1707).

In the case in which a result of the judgment of the S1701 is negative (S1701: NO), the I/O program 3505 judges whether a real page allocated to a read source virtual page specified by the read request is a default page or not (S1702).

In the case in which a result of the judgment of the S1702 is positive (S1702: YES), the I/O program 3505 reads data from an allocated page that has been allocated to the read source virtual page (S1703).

In the case in which a result of the judgment of the S1702 is negative (S1702: NO), the I/O program 3505 reads data from a default page that has been allocated to the read source virtual page (S1704).

The I/O program 3505 writes data that has been read in S1703 or S1704 to the cache memory 32 (S1705).

After that, the I/O program 3505 reads data that has been written in S1705 from the cache memory 32 (S1706), and transmits the data to the host computer 10 (S1707).

Figure 18:
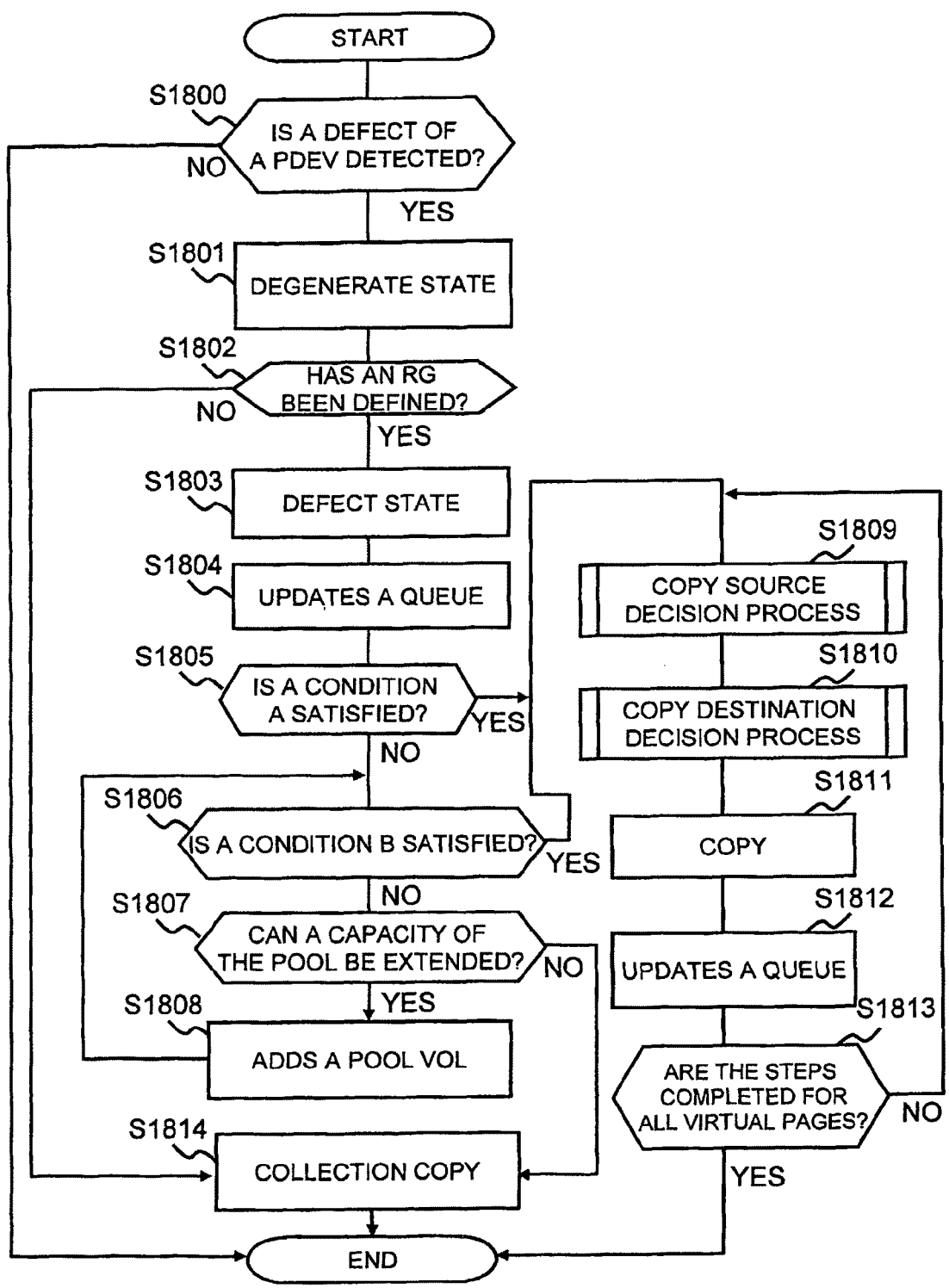
FIG. 18 shows a flow of a defect handling processing.

FIG. 18 shows a flow of a defect handling processing.

In the case in which a defect of a PDEV is detected (S1800: YES), the rebuild control program 5001 changes a state of a defect RG provided with the PDEV to a degenerate state (S1801). The rebuild control program 5001 then judges whether the defect RG is an RG defined in the pool 60 or not (S1802). The judgment can be carried out based on the table (not shown) in which information related to each RG is described.

Figure 1A:
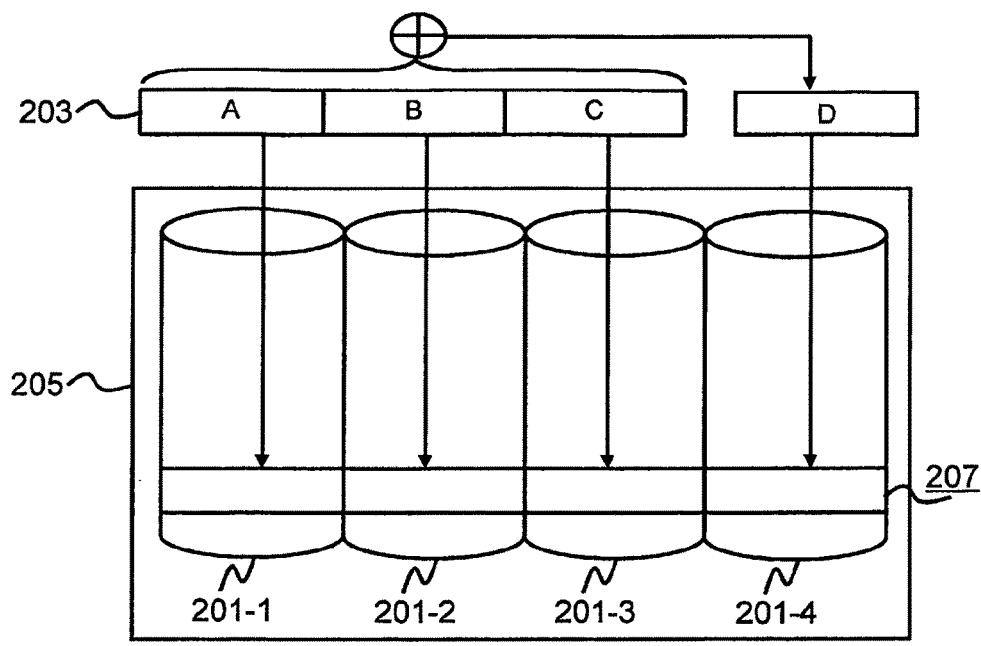
FIG. 1A is an illustration for writing at RAID5.
Figure 1B:
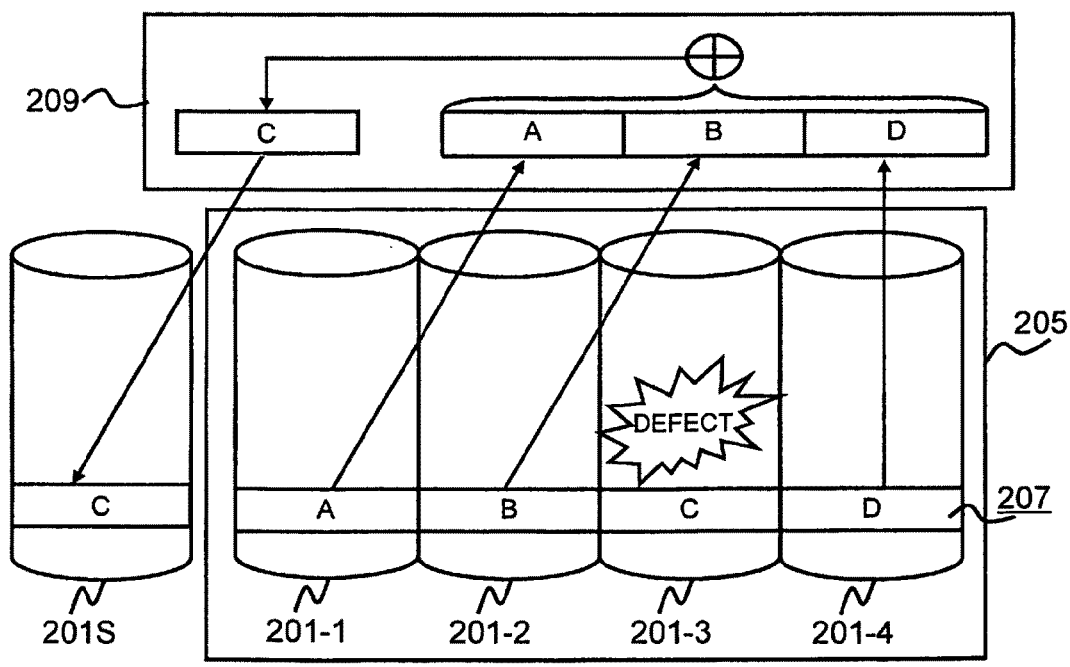
FIG. 1B is an illustration for a collection copy at RAID5.

In the case in which a result of the judgment of the S1802 is negative (S1802: NO), the rebuild control program 5001 carries out a collection copy for the defect RG (S1814). More specifically, as described with reference to FIG. 1B, the rebuild control program 5001 restores data in the PDEV in which a defect has been detected based on data in another PDEV in the defect RG, and writes the restored data to a spare PDEV for instance. The defect RG can also be recovered by making a spare PDEV to be a PDEV of a member of the RG.

On the other hand, in the case in which a result of the judgment of the S1802 is positive (S1802: YES), the rebuild control program 5001 changes a state of a defect RG from a degenerate state to a defect state (S1803). The rebuild control program 5001 then moves an allocated queue 1401A corresponded to the defect RG to a defect queue corresponded to the defect RG, and moves a free queue 1401F corresponded to the defect RG to a defect queue corresponded to the defect RG (S1804).

The rebuild control program 5001 judges whether a condition A is satisfied or not (S1805). The condition A is that reserve pages of the number equivalent to or larger than that of allocated pages based on the defect RG are included in a plurality of real pages based on all RGs other than the defect RG. For instance, in the case in which a free queue corresponded to all RGs other than the defect RG (RGs that are basis of the same pool) has PSCBs of the number equivalent to or larger than that of PSCBs corresponded to allocated pages for a defect queue corresponded to the defect RG, a result of the judgment of the S1805 is positive.

In the case in which a result of the judgment of the S1805 is positive (S1805: YES), the rebuild processing composed of steps S1809 to S1813 is carried out.

On the other hand, in the case in which a result of the judgment of the S1805 is negative (S1805: NO), the judgment of the S1806, that is, the judgment whether a condition B is satisfied or not is carried out (S1806). The condition B is that unallocated pages that can be a copy destination in the rebuild processing and that have the number equivalent to or larger than that of allocated pages based on the defect RG are included in a plurality of real pages based on all RGs other than the defect RG. For instance, in the case in which the value of {(the total number of allocated pages based on the RG other than the defect RG/the total number of unallocated pages that can be copy destinations based on the RG other than the defect RG)×100(%)} exceeds the second threshold value 35229 corresponded to a pool related to the defect RG, a result of the judgment of the S1806 is negative. In place of carrying out the above calculation, in the case in which the number of PSCBs in a free queue or a reserve queue corresponded to all RGs other than the defect RG (RGs that are basis of the same pool) is less than the number of PSCBs corresponded to allocated pages for a defect queue corresponded to the defect RG, a result of the judgment of the S1806 can be negative.

In the case in which a result of the judgment of the S1806 is positive (S1806: YES), the rebuild processing composed of steps S1809 to S1813 is carried out.

On the other hand, in the case in which a result of the judgment of the S1806 is negative (S1806: NO), the rebuild control program 5001 judges whether a capacity of the pool 60 can be extended or not (S1807). For instance, the judgment can be carried out based on whether an extension of RGs can be carried out or not. In the case in which a result of the judgment of the S1807 is positive (S1807: YES), a pool VOL is added to the pool 60 according to the instructions from the management computer 20 (S1808), and the judgment of the S1806 is then carried out again. In the case in which a result of the judgment of the S1807 is negative (S1807: NO), a collection copy is carried out for the defect RG (S1814).

In the rebuild processing, a copy source decision process of S1809, a copy destination decision process of S1810, a copy of S1811, and a queue update of S1812 are carried out for all allocated pages based on the defect RG (S1813).

In the copy source decision process of S1809, a storage area of the copy source is decided.

In the copy destination decision process of S1810, a real page of the copy destination is decided.

In the copy of S1811, data that has been stored into the copy source storage area decided in S1809 is copied to the copy destination real page decided in S1810. More specifically, for instance, the rebuild control program 5001 reads data from the copy source storage area and writes the data to the cache memory 32. Subsequently, the rebuild control program 5001 reads the data from the cache memory 32 and writes the data to the copy destination real page. The data that has been written to the cache memory 32 is copied on the cache memory 32 by the rebuild control program 5001. The copied data can also be written to the copy destination real page.

In the queue update of S1812, the rebuild control program 5001 carries out the following steps (1812-1) and (1812-2):

(1812-1) moving a PSCB corresponded to the copy destination real page from a reserve queue (or a free queue) corresponded to an RG that is a basis of the real page to an allocated queue corresponded to the RG; and (1812-2) changing the pointer 35234 in the entry 35232 for a virtual page corresponded to the copy source storage area (see FIG. 13) from information that indicates a PSCB corresponded to an allocated page corresponded to the defect RG to information that indicates a PSCB corresponded to the copy destination real page.

The rebuild control program 5001 judges whether or not the steps S1809 to S1811 are carried out for all virtual pages to which a real page based on the defect RG is allocated (S1813). In the case in which a result of the judgment is negative (S1813: NO), S1809 is carried out again. In the case in which a result of the judgment is positive (S1813: YES), the defect handling processing is terminated.

In the example of FIG. 18, the loop of the steps S1809 to S1812 is carried out for every virtual page to which a real page based on the defect RG is allocated. However, as substitute for that, the steps S1809 and S1810 can be carried out for all virtual pages to which a real page based on the defect RG is allocated, and the copy of S1811 can then be carried out at once from all of the copy source storage areas to all of the copy destination real pages.

Figure 19:
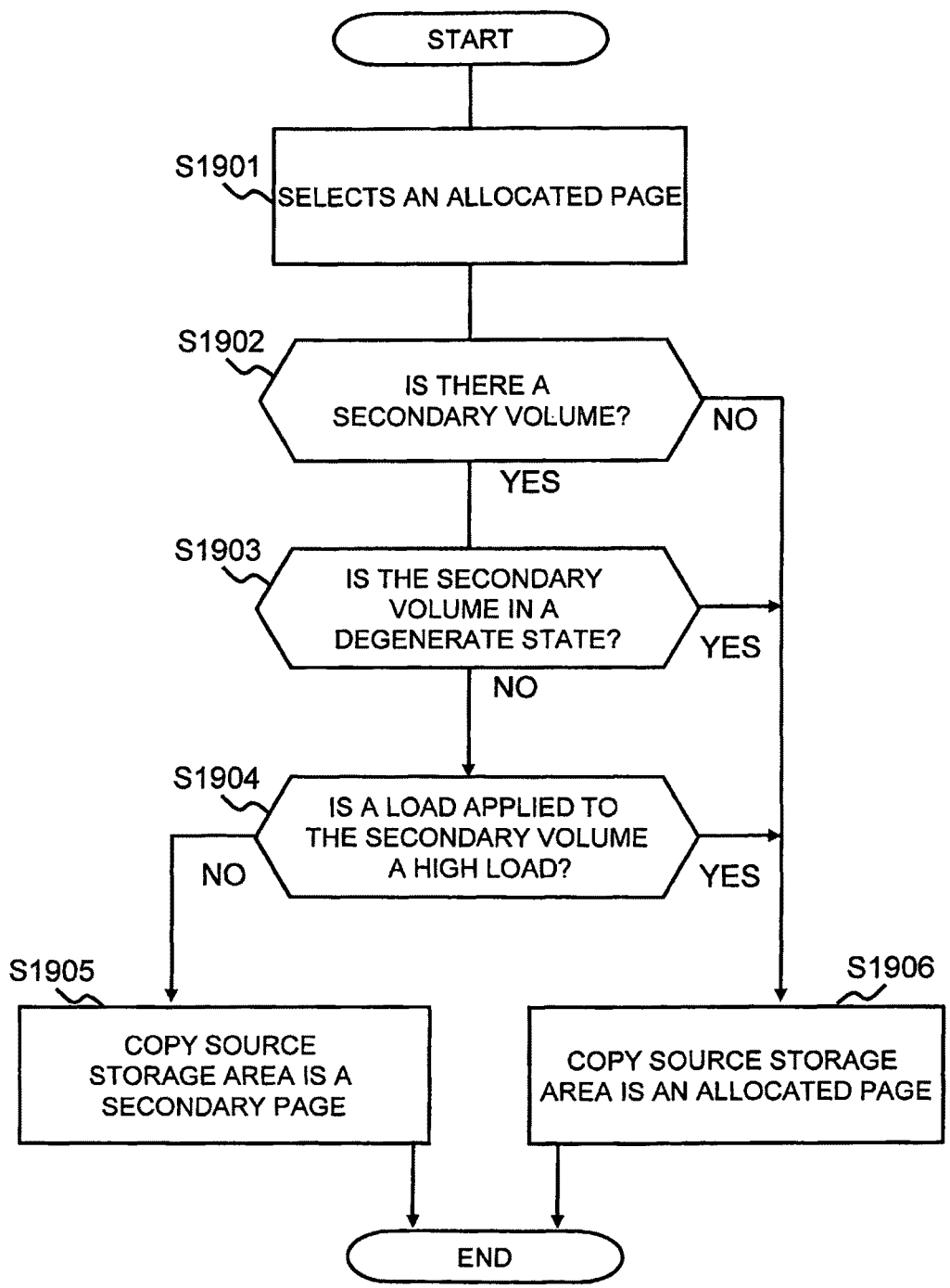
FIG. 19 shows a flow of a copy source decision processing.

FIG. 19 shows a flow of a copy source decision processing.

The rebuild control program 5001 selects any of allocated pages that are not selected in the processing among allocated pages based on the defect RG (S1901).

The rebuild control program 5001 then judges whether or not there is a secondary volume that configures a volume pair with a VVOL (S1902). The judgment can be carried out based on a table in which information related to logical volumes that configure a volume pair is described for instance (not shown). The secondary volume is a copy destination logical volume. The secondary volume is provided with a plurality of storage areas (hereafter referred to as a secondary page) corresponded to a plurality of virtual pages that configure the VVOL, respectively. The secondary page and the virtual page are corresponded to each other on a one-on-one basis for instance. A storage capacity of the secondary volume is equivalent to or larger than that of the VVOL.

In the case in which a result of the judgment of the S1902 is positive (S1902: YES), the rebuild control program 5001 judges whether or not the secondary volume is in a degenerate state (S1903). The judgment can be carried out based on a table in which information related to each logical volume is described for instance (not shown). For instance, in the case in which any of RGs is in a degenerate state, a logical volume based on the RG is in a degenerate state.

In the case in which a result of the judgment of the S1903 is negative (S1903: NO), the rebuild control program 5001 judges whether a load applied to the secondary volume is a high load or not (S1904). The judgment can be carried out based on a table in which information related to each logical volume is described for instance (not shown). For instance, in the case in which an I/O frequency of the secondary volume (the number of I/O in a predetermined time) described in the table exceeds a certain I/O frequency threshold value, it is judged that a high load is applied to the secondary volume.

In the case in which a result of the judgment of the S1904 is negative (S1904: NO), the rebuild control program 5001 decides the copy source storage area as a secondary page corresponded to a virtual page to which the allocated page selected in S1901 is allocated (S1905). More specifically, in the case in which there is a secondary volume that configures a pair with a VVOL, the secondary volume is not in a degenerate state, and a high load is not applied to the secondary volume, a secondary page corresponded to a virtual page to which the allocated page selected in S1901 is allocated is the copy source storage area.

On the other hand, in the case in which a result of the judgment of the S1902 is negative (S1902: NO), in the case in which a result of the judgment of the S1903 is positive (S1903: YES), or in the case in which a result of the judgment of the S1904 is positive (S1904: YES), the rebuild control program 5001 decides the copy source storage area as the allocated page selected in S1901 (S1906). More specifically, in the case in which there is not a secondary volume that configures a pair with a VVOL, the secondary volume is not in a degenerate state even if there is a secondary volume, or a high load is applied to the secondary volume, the allocated page selected in S1901 is the copy source storage area.

Figure 20:
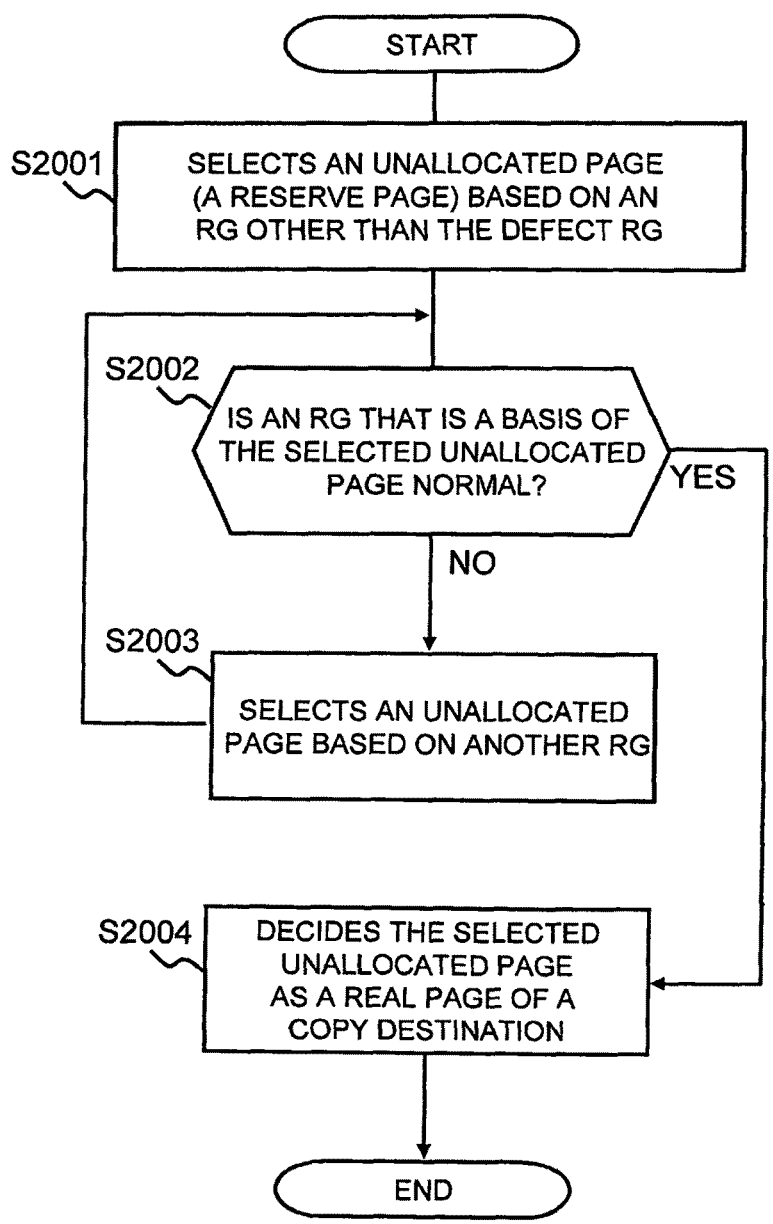
FIG. 20 shows a flow of a copy destination decision processing.

FIG. 20 shows a flow of a copy destination decision processing.

The rebuild control program 5001 selects an unallocated page based on an RG other than the defect RG (S2001). The unallocated page to be selected here is a reserve page in principle. In the case in which there in not a reserve page, the unallocated page is a free page that can be a real page of a copy destination (a free page corresponded to a PSCB included in a flag indicating that the free page can be a copy destination). Moreover, the unallocated page to be selected is a page based on an RG different from an RG that is a basis of a page decided in an immediately preceding copy destination decision processing in principle. This is not to focus a copy destination on one RG. An unallocated page is selected from a pool corresponded to the VVOL.

The rebuild control program 5001 judges whether an RG that is a basis of the unallocated page selected in S2001 is normal or not (S2002).

In the case in which a result of the judgment of the S2002 is negative (S2002: NO), the rebuild control program 5001 selects an unallocated page based on an RG different from an RG that is a basis of an unallocated page selected in S2001 (S2003). After that, the judgment of S2002 is carried out.

In the case in which a result of the judgment of the S2002 is positive (S2002: YES), the rebuild control program 5001 decides the unallocated page selected in S2001 (or S2003) as a real page of a copy destination (S2004).

After the copy source storage area and the copy destination real page are decided as described above, a copy is carried out.

Figure 21:
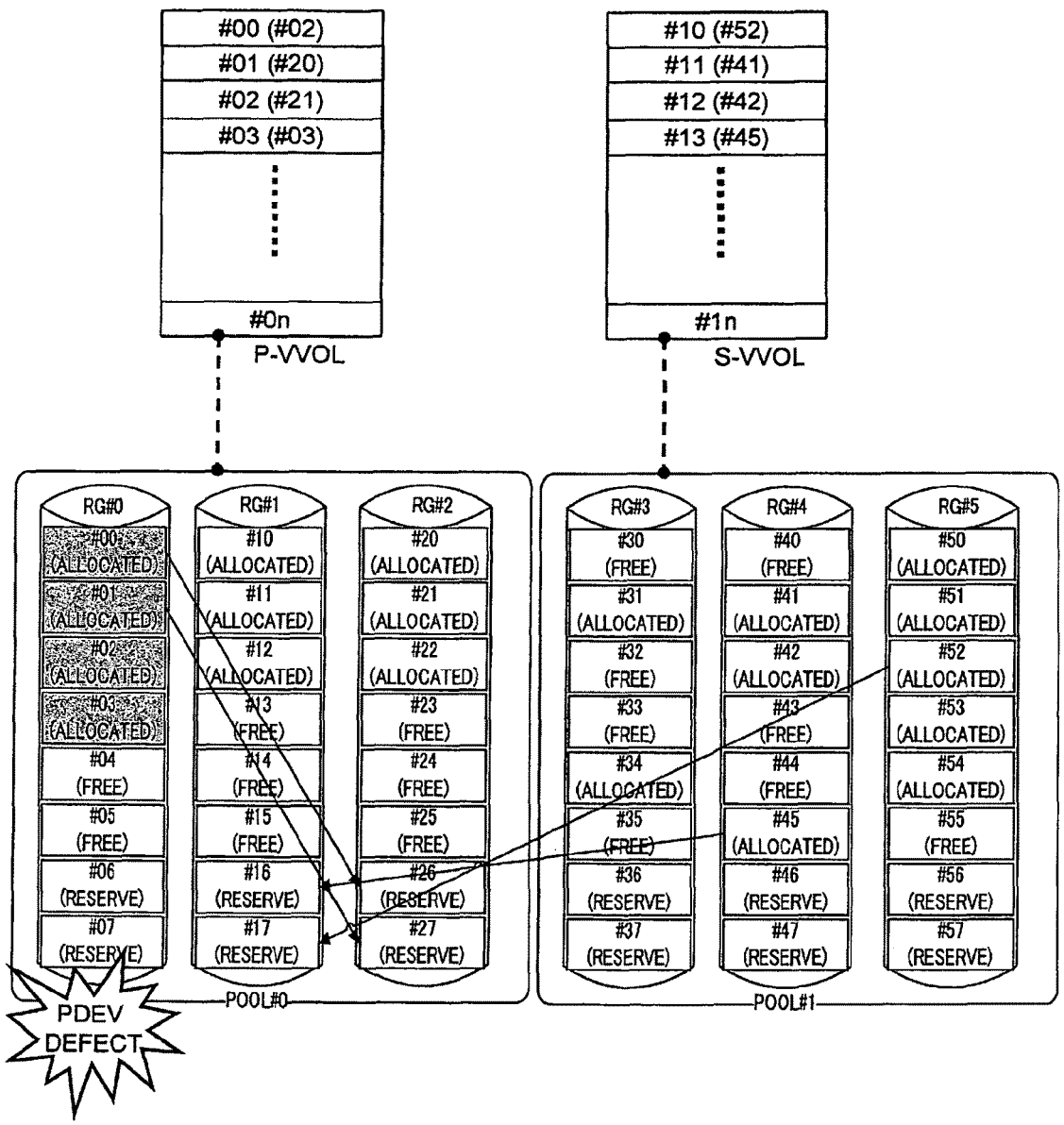
FIG. 21 shows an example of a copy in a rebuild processing in the case in which a secondary volume is a VVOL (a virtual volume).

For instance, as shown in FIG. 21, in the case in which a secondary volume is a VVOL (hereafter referred to as an S-VVOL) and the copy source storage areas for the virtual pages #00 and #03 in a primary VVOL (hereafter referred to as an P-VVOL) that configures a pair with the VVOL are the secondary pages (the virtual pages) #10 and #13, the following copy is carried out. The allocated pages #52 and #45 that have been allocated to the secondary pages #10 and #13 are specified from the pool #1 corresponded to the S-VVOL separate from the pool #0 corresponded to the P-VVOL, and data is copied from the allocated pages #52 and #45 that have been specified to the reserve pages (the copy destination real pages) #16 and #17 in the pool #0 corresponded to the P-VVOL.

Figure 22:
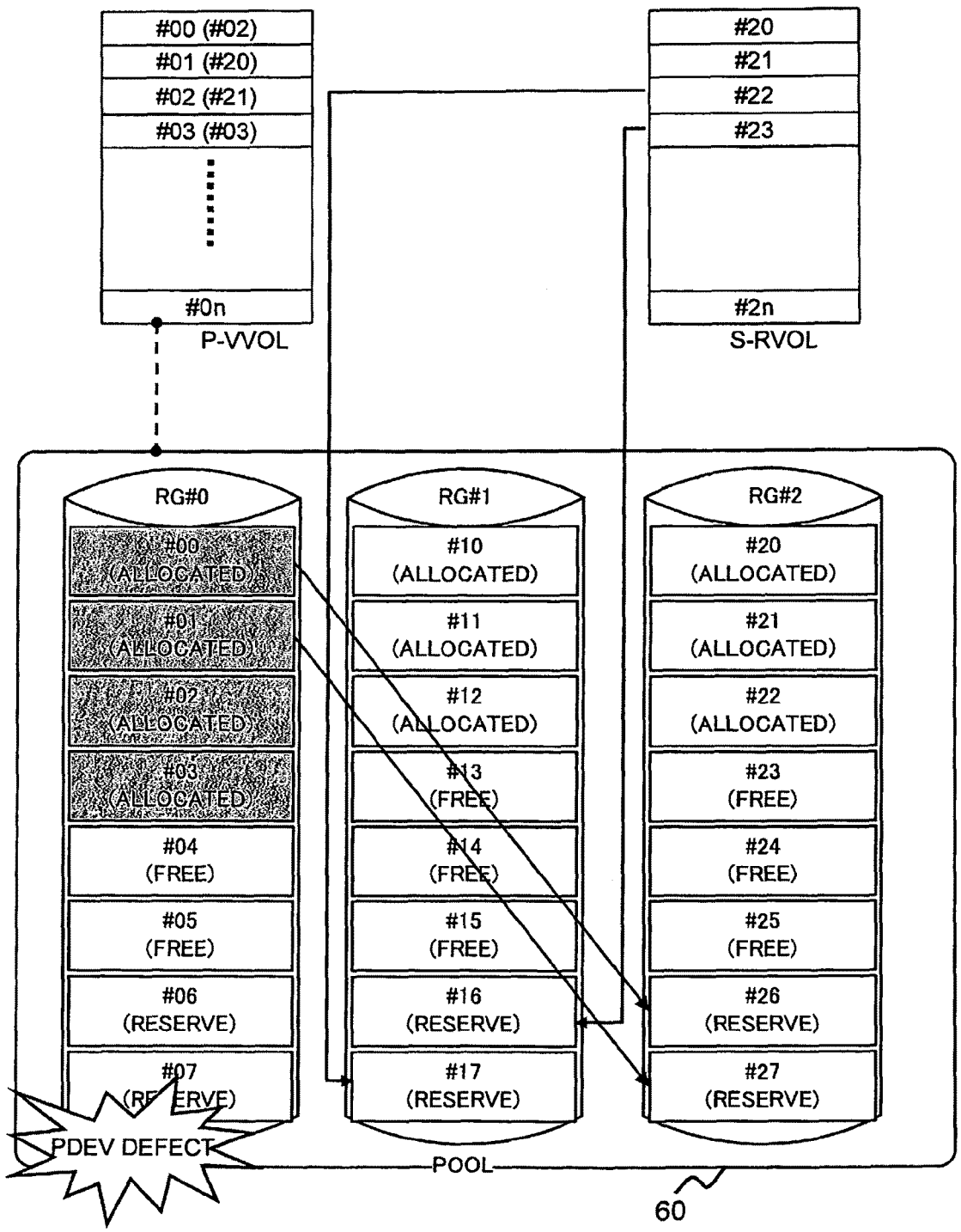
FIG. 22 shows an example of a copy in a rebuild processing in the case in which a secondary volume is an RVOL (a real volume).

Moreover, as shown in FIG. 22 for instance, in the case in which a secondary volume is an RVOL (hereafter referred to as an S-RVOL) and the copy source storage areas for the virtual pages #02 and #03 in a primary VVOL (hereafter referred to as an P-VVOL) that configures a pair with the RVOL are the secondary pages #22 and #23, the following copy is carried out. Data is copied from the secondary pages #22 and #23 to the reserve pages (the copy destination real pages) #17 and #16 in the pool corresponded to the P-VVOL.

In FIGS. 21 and 22, data is read in parallel from a secondary volume and a real page that has been allocated to the P-VVOL, and the read data is copied to an unallocated page of the copy destination. The unallocated page of the copy destination is a reserve page in a pool corresponded to the P-VVOL (it can also be a free page), and is a real page based on an RG other than the defect RG.

For the copy source decision processing that has been described with reference to FIG. 20, an unallocated page of the copy destination is not selected from at least two real pages based on one RG, but is evenly selected from a plurality of real page groups based on a plurality of RGs other than the defect RG.

While the preferred embodiments in accordance with the present invention have been described above, the present invention is not restricted to the embodiments, and various changes, modifications, and functional additions can be thus made without departing from the scope of the present invention.

For instance, the rebuild control program 5001 can change a free page that has the number based on the number of reserve pages reduced by the rebuild processing and that is based on at least one RG other than the defect RG to a reserve page. For instance, in each case in which reserve pages are reduced, any of free pages can be changed to a reserve page. Or more specifically, the number of free pages that are changed to a reserve page can be decided depending on the number of free pages in a pool based on an RG other than the defect RG.

For instance, as described above, the rebuild control program 5001 can carry out a return processing after the rebuild processing is completed. More specifically, the rebuild control program 5001 can return the copied data from a real page of the copy destination (a real page of the return source) to any of the unallocated real pages (a real page of the return destination) based on the recovered RG, and can allocate a real page of the return destination to a virtual page that has been allocated to the real page of the return source.

The invention claimed is:

1. A storage system, comprising:
a plurality of RAID groups each combining a plurality of physical storage devices into a respective storage device group that stores data based on a corresponding RAID level for the storage device group;
a pool that is a storage area group associated with one or more RAID groups of the plurality of RAID groups, the pool being composed of a plurality of real pages that are based on one or more RAID groups, the plurality of real pages including a plurality of allocated real pages that are each allocated to any of a plurality of a virtual pages that configure a virtual volume and a plurality of unallocated real pages that are not allocated to any of the plurality of virtual pages;
an I/O part configured to carry out a write processing that includes:
allocating any one of the unallocated real pages to a write destination virtual page of the plurality of virtual pages; and
writing a write target data to the unallocated real page that is allocated to the write destination virtual page; and
a rebuild control part configured to carry out a rebuild processing that includes:
copying each of data that has been stored into all allocated real pages among the plurality of real pages that are based on a specific RAID group of the one or more RAID groups that has a physical storage device in which a defect occurs to an unallocated real page that is based on at least one RAID group separate from the specific RAID group of the one or more RAID groups; and
allocating a real page of each copy destination in place of an allocated real page of each copy source to each virtual page to which the allocated real page of each copy source is allocated, and wherein:
each real page is a physical storage area,
each virtual page is a virtual storage area,
each of the plurality of unallocated real pages, upon being allocated to any of the virtual pages by the I/O part, becomes an allocated real page,
upon a defect occurring in any of the physical storage devices, in accordance with which the RAID group that has the physical storage in which the defect occurs is a defect RAID group, the rebuild control part determines if the defect RAID group is associated with the pool, performs the rebuild processing on the defect RAID group by regarding the defect RAID group as the specific RAID group if the defect RAID group is associated with the pool, and, if the defect RAID group is not associated with the pool, performs collection copy for the defect RAID group, and
in performing the rebuild processing on the defect RAID group, the rebuild control part reads a plurality of data elements stored in a physical storage device of the respective storage device group for the defect RAID group other than the physical storage device in which the defect occurs among data elements that configure data stored in each of the allocated real pages that is based on the defect RAID group, recovers data elements stored in the physical storage device in which the defect occurs based on the plurality of read data elements, and copies data that is composed of the plurality of read data elements and the recovered data elements to the unallocated real page that is based on at least one RAID group of the one or more RAID groups other than the defect RAID group.

2. The storage system as defined in claim 1, further comprising a secondary volume that configures a volume pair with the virtual volume, and wherein:
the secondary volume is composed of a plurality of secondary pages that are each a storage area and each associated with the plurality of virtual pages,
the unallocated real page that is allocated to the write destination virtual page in the write processing is a free page,
the unallocated real page of the copy destination in the rebuild processing is a reserve page, and the reserve page is a real page that is not allocated to any virtual page and that is not a free page, and is an unallocated real page that is not allocated to the write destination virtual page in the write processing,
a plurality of sub storage area lines are configured based on each RAID group, each sub storage area line is disposed over a plurality of physical storage devices that configure the RAID group, and is composed of sub storage areas included in each of the plurality of physical storage devices in one RAID group,
one real page is corresponded to at least one sub storage area line, and therefore data to be written to the real page is written to at least one sub storage area line corresponded to the real page,
at least one reserve page is configured in at least two real pages based on each RAID group,
even in the case in which any of the one or more RAID groups is the specific RAID group and all real pages other than the reserve page among all real pages based on the specific RAID group are allocated real pages, a number of reserve pages that is equivalent to or larger than that of the allocated real pages are included in at least two real pages based on at least one RAID group other than the specific RAID group, in the case in which data in a secondary page corresponded to a virtual page to which an allocated real page based on the specific RAID group is allocated is not different from data in the allocated real page that is allocated to the virtual page and a high load is not applied to the secondary volume, the rebuild control part reads data not from the allocated real page but from the corresponded secondary page in the rebuild processing and copies the read data to the reserve page or the free page of the copy destination, and on the other hand, in the case in which the data in a secondary page corresponded to a virtual page to which an allocated real page based on the specific RAID group is allocated is different from data in the allocated real page that is allocated to the virtual page or a high load is applied to the secondary volume, the rebuild control part reads data from the allocated real page and copies the read data to the reserve page or the free page of the copy destination, and therefore that data is read from any of the allocated real pages based on the specific RAID group and that data is read from any of the secondary pages may be carried out in parallel in the rebuild processing, and even during the rebuild processing, in the case in which a writing to any of the virtual pages occurs, the I/O part carries out the write processing for the virtual page, and the I/O part allocates a free page based on a RAID group other than the specific RAID group to the virtual page in the write processing, and on the other hand, in the case in which a reading from any of the virtual pages occurs, the I/O part reads data from the real page even in the case in which the real page that is allocated to the virtual page is a real page based on the specific RAID group.

3. The storage system as defined in claim 2, wherein a number of reserve pages or free pages that are copy destinations is uniform for each of the other RAID groups.

4. The storage system as defined in claim 2, wherein the rebuild control part changes the unallocated real pages having the number based on the number of reserve pages reduced by the rebuild processing for at least one RAID group separate from the specific RAID group to reserve pages.

5. The storage system as defined in claim 1, wherein the rebuild control part carries out a first judgment of whether a plurality of reserve pages of a quantity that is equivalent to or larger than that of allocated real pages based on the specific RAID group is included in a plurality of real pages based on the at least one RAID group separate from the specific RAID group, and in the case in which a result of the first judgment is negative, the rebuild control part carries out a second judgment of whether a plurality of free pages of a quantity that is equivalent to or larger than that of allocated real pages based on the specific RAID group and that can be a copy destination in the rebuild processing is included in a plurality of real pages based on the at least one RAID group separate from the specific RAID group, and in the case in which a result of the second judgment is also negative, a collection copy for the specific RAID group is carried out in place of the rebuild processing, and on the other hand, in the case in which a result of the first judgment or the second judgment is positive, the rebuild control part carries out the rebuild processing.

6. The storage system as defined in claim 1, further comprising a secondary volume that configures a volume pair with the virtual volume, wherein:

the secondary volume is composed of a plurality of secondary pages that are each a storage area and each associated with the plurality of virtual pages, and in the case in which data in a secondary page corresponded to a virtual page to which an allocated real page based on the specific RAID group is allocated is not different from data in the allocated real page that is allocated to the virtual page, the rebuild control part reads data not from the allocated real page but from the corresponded secondary page in the rebuild processing and copies the read data to an unallocated real page of the copy destination, and on the other hand, in the case in which the data is different from each other, the rebuild control part reads data from the allocated real page and copies the read data to an unallocated real page of the copy destination, and therefore that data is read from any of the allocated real pages based on the specific RAID group and that data is read from any of the secondary pages may be carried out in parallel in the rebuild processing.

7. The storage system as defined in claim 6, wherein the secondary volume is a logical volume based on a RAID group that is not a basis of the real page in the pool.

8. The storage system as defined in claim 6, wherein even in the case in which the data is not different from each other, the rebuild control part reads data from the allocated real page in the rebuild processing in the case in which a high load is applied to the secondary volume or the secondary volume is in a degenerate state.

9. The storage system as defined in claim 1, wherein:

even during the rebuild processing, in the case in which a writing to any of the virtual pages occurs, the I/O part carries out the write processing for the virtual page, and the I/O part allocates an unallocated real page based on a RAID group other than the specific RAID group to the virtual page in the write processing, and on the other hand, in the case in which a reading from any of the virtual pages occurs, the I/O part reads data from the real page even in the case in which the real page that is allocated to the virtual page is a real page based on the specific RAID group.

10. The storage system as defined in claim 1, wherein the number of unallocated real pages that are the copy destinations is uniform for each of the other RAID groups.

11. The storage system as defined in claim 1, wherein:

in the case in which the specific RAID group is recovered, the rebuild control part carries out a return processing comprising the steps of:

returning the data that has been copied in the rebuild processing to any of the unallocated real pages based on the specific RAID group; and allocating a real page of the return destination in place of the real page of the return source to a virtual page that is allocated to the real page of the return source.

* * * * *